United States Patent
Feldman et al.

(10) Patent No.: US 10,169,259 B2
(45) Date of Patent: *Jan. 1, 2019

(54) PATTERN-BASED SERVICE BUS ARCHITECTURE USING ACTIVITY-ORIENTED SERVICES

(71) Applicant: Savigent Software, Inc., Bloomington, MN (US)

(72) Inventors: Michael Feldman, Edina, MN (US); Alexander Fiksel, Plymouth, MN (US); Vadim Mirkin, Maple Grove, MN (US)

(73) Assignee: Savigent Software, Inc., Bloomington, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/251,932

(22) Filed: Aug. 30, 2016

(65) Prior Publication Data

US 2016/0371205 A1    Dec. 22, 2016

Related U.S. Application Data

(63) Continuation of application No. 13/828,393, filed on Mar. 14, 2013, now Pat. No. 9,430,416.

(51) Int. Cl.
  *G06F 13/16* (2006.01)
  *G06F 13/42* (2006.01)

(52) U.S. Cl.
  CPC ...... *G06F 13/1673* (2013.01); *G06F 13/1642* (2013.01); *G06F 13/4282* (2013.01)

(58) Field of Classification Search
  CPC ............ G06F 13/1642; G06F 13/1673; G06F 13/4282
  See application file for complete search history.

(56) References Cited

U.S. PATENT DOCUMENTS

| | | | |
|---|---|---|---|
| 7,260,389 B2 | 8/2007 | Allen et al. | |
| 7,759,821 B2 | 7/2010 | Lando et al. | |
| 8,156,140 B2 * | 4/2012 | Roshen | H04L 67/16 707/613 |
| 8,352,491 B2 * | 1/2013 | Roshen | G06F 17/30864 707/769 |
| 8,775,651 B2 * | 7/2014 | Brown | H04L 67/2823 709/230 |
| 8,949,457 B1 | 2/2015 | Theroux | |

(Continued)

*Primary Examiner* — Nimesh G Patel
(74) *Attorney, Agent, or Firm* — Billion & Armitage; Michael A. Collins

(57) ABSTRACT

A pattern-based service bus includes a plurality of bus endpoints, a bus-hosted service, and a bus storage component. The plurality of bus endpoints interact with bus participants external to the pattern-based service bus, wherein each of the plurality of bus endpoints are identified by a unique address, and type of interaction to be provided by the bus endpoint. The bus-hosted service implements patterns that define allowed interactions between each of the plurality of bus endpoints and the bus-hosted service, wherein the implemented patterns can be utilized by the plurality of bus endpoints to interact with the bus-hosted service. The bus storage component interacts with the bus-hosted service to store information relevant to operation of the pattern-based service bus.

20 Claims, 19 Drawing Sheets

(56) References Cited

U.S. PATENT DOCUMENTS

| | | | |
|---|---|---|---|
| 9,021,083 B2* | 4/2015 | Little | G06F 17/30306 709/203 |
| 2007/0026534 A1 | 11/2007 | Pavlick | |
| 2009/0089078 A1 | 4/2009 | Bursey | |
| 2010/0325567 A1 | 12/2010 | Berestetsky et al. | |
| 2013/0024179 A1 | 1/2013 | Mazzaro et al. | |
| 2013/0246589 A1 | 9/2013 | Klemba | |
| 2014/0149592 A1 | 5/2014 | Krishna | |

* cited by examiner

PATTERN-BASED SERVICE BUS ARCHITECTURE USING ACTIVITY-ORIENTED SERVICES

CROSS REFERENCE TO RELATED APPLICATION

This application is a continuation of U.S. application Ser. No. 13/828,393, filed Mar. 14, 2013, the content of which is incorporated by reference in its entirety.

BACKGROUND

The present invention is related to service buses, and in particular to an activity-oriented service bus.

A service-oriented architecture (SOA) is an architecture commonly employed to allow consumers of services to communicate with a plurality of services without requiring the service consumers to make function calls directly to service providers. Communication between the plurality of loosely coupled software services is made possible by a service bus, such as the enterprise service bus (ESB). The concept of a service bus employed in SOA systems is derived from use of the word "bus" in hardware applications, in which the hardware bus allows various components to communicate with each other across the bus, and allows components to be plugged in and out without problem. The goal of the service bus is to allow the plurality of loosely coupled software services to be able to communicate with one another and to allow software services to be added and subtracted without problem.

The main responsibilities of a service bus include interfacing with the service providers/consumer, converting messages between the different protocols employed by the various service providers/consumers, and routing messages between various service providers/consumers.

Development of a typical SOA architecture requires a user to create a service definition document that describes the services provided by service providers. For example, a Web Services Description Language (WSDL) is an example of this type of document, wherein the WSDL describes the operations that are available to service consumers to invoke. A service provider that wishes to invoke a service provider needs access to the service definition implemented by the service provider during an implementation or development phase. As a result, the service consumer is tightly bound to the service definition, which complicates changes to implementation of service providers. For example, updating a service provider requires creation of a new service definition and may require continued maintenance of multiple service definitions to accommodate service consumers utilizing different versions of the same service.

That is, a typical service bus can be described as playing a passive role as connector between service provider and service consumers. Complex interactions between consumers and providers are left to implementation outside of the service bus. Furthermore, typical SOA systems only allow one type of interaction between service consumer and service providers, wherein a service consumer makes a function call to a service provider. While the service bus may implement protocol conversion and/or data transformation, the general use pattern remains a client-server type relationship.

SUMMARY

A pattern-based service bus includes a plurality of bus endpoints, a bus-hosted service, and a bus storage component. The plurality of bus endpoints interact with bus participants external to the pattern-based service bus, wherein each of the plurality of bus endpoints are identified by a unique address, and type of interaction to be provided by the bus endpoint. The bus-hosted service implements patterns that define allowed interactions between each of the plurality of bus endpoints and the bus-hosted service, wherein the implemented patterns can be utilized by the plurality of bus endpoints to interact with the bus-hosted service. The bus storage component interacts with the bus-hosted service to store information relevant to operation of the pattern-based service bus.

DETAILED DESCRIPTION

The pattern-based service bus architecture of the present invention constrains interactions between bus participants to interactions between the bus participant and the pattern-based service bus. Interactions between bus participants and the pattern-based service bus are defined by patterns implemented by the pattern-based service bus, wherein the pattern-based service bus is responsible for handling activities invoked/published by the bus participants and delivering those activities to other bus participants. A consequence of this configuration, is bus participants are not aware of and do not interact directly with one another. Rather, each bus participant interacts only with the pattern-based service bus via the interactions defined by the patterns implemented by the pattern-based service bus.

Figure 1:
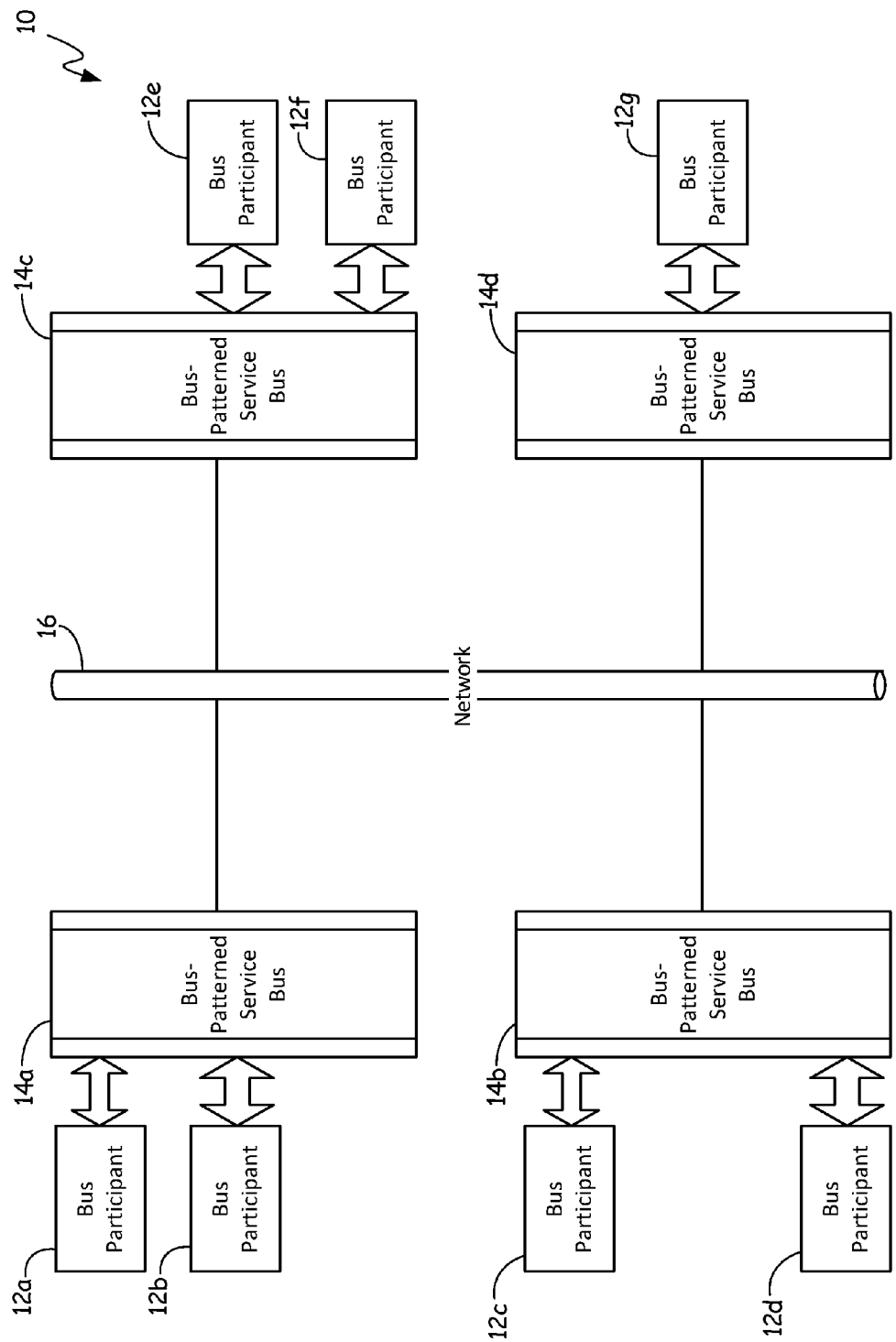
FIG. 1 is block diagram illustrating a service oriented architecture utilizing a pattern-based service bus according to an embodiment of the present invention.

FIG. 1 is block diagram illustrating service oriented architecture 10 that includes bus participants 12a-12g, pattern-based service buses 14a-14d and network 16 according to an embodiment of the present invention. Bus participants 12a-12b interact with pattern-based service bus 14a, bus-participants 12c and 12d interact with pattern-based service bus 14b, bus-participants 12e and 12f interact with pattern-based service bus 14c, and bus-participant 12g interacts with pattern-based service bus 14d. Pattern-based service buses 14a-14d communicate with one another via network 16. Each bus participant interacts with pattern-based service buses 14a-14d via patterns implemented by the pattern-based service buses. These patterns, discussed in more detail below, allow bus participants to invoke/publish activities onto pattern-based service buses 14a-14d and allow these activities to be delivered to other bus participants. That is, bus participant 12a may interact with pattern-based service bus 14a to invoke a particular activity or service. In response, pattern-based service bus 14a communicates via network 16 with pattern-based service bus 14d to request performance of the activity from bus participant 12g. Bus participant 12a has no knowledge of bus participant 12g. Rather, each bus participant 12a, 12g interacts only with its associated pattern-based bus service 14a, 14d, respectively.

One of the benefits of the present invention is the architecture is well-suited to distributed systems. In particular, the present invention simplifies development of bus participants, as each bus participant must only be capable of interacting with pattern-based service buses 14a-14d according to the patterns implemented and made available by pattern-based service bus 14a-14d. Although one of the benefits of the present invention is the capability of pattern-based service buses 14a-14d to be distributed as illustrated in FIG. 1, the pattern-based service buses 14a-14d are referred to generically as pattern-based service bus 14. Likewise, the plurality of bus participants 12a-12g illustrated in FIG. 1 are referred to generically as bus participants 12.

Bus Participants

Each bus participant 12 is an application that implements partial functionality of the overall system. Bus participants 12 are implemented with a combination of hardware/software, and may reside on a computer, piece of manufacturing equipment, sensor, or other device capable of interfacing with pattern-based service bus 14. Application logic associated with each bus participant 12 defines the services/functions implemented by that bus participant. For example, a piece of manufacturing equipment may utilize a plurality of bus participants including a bus participant that is configured to receive commands from pattern-based service bus 14 instructing the machine to "start", and may publish data and/or events onto pattern-based service bus 14 for consumption by other bus participants concerning the operation of the machine.

Each bus participant 12 interacts with pattern-based service bus via a defined Type object, wherein a typed object is typically a complex object including a plurality of fields. When interacting with pattern-based service bus 14, an instance of the typed object (referred to generically as an activity instance) is either provided to or received from pattern-based service bus 14. Although an infinite number of typed objects may be created, as described below, in most embodiments a plurality of well-known typed objects can be employed to achieve most interactions desired in an application.

As discussed above, bus participants 12a-12g do not interact with one another directly. For example, bus participant 12a will have no knowledge of bus participant 12g. Rather, bus participants interact only with pattern-based service bus 14 via patterns provided and implemented by service bus 14. In an exemplary embodiment, application logic used to implement the bus participants are reusable components that may form the basis of a plurality of other bus participants for interacting with pattern-based service bus 14.

In addition, application logic defining bus participant actions may run asynchronously, with each bus participant capable of handling a plurality of concurrent action/command/event instances provided by pattern-based service bus 14. For example, pattern-based service bus 14 may deliver via a delivery pattern an action instance invoked by another bus participant for performance to bus participant 12a. While executing the first action instance, another bus participant may invoke a second action instance for performance by bus participant 12a. Although some delivery patterns call for pattern-based service bus 14 to manage delivery of the action instance, in other embodiments pattern based service bus 14 delivers both action instances for performance by bus participant 12a, which itself manages performance of each action instance.

Although bus participants 12a-12g do not have knowledge of other bus participants connected to pattern-based service bus 14, each bus participant is identified to pattern-based service bus 14 by a unique ID, such as the commonly employed unique resource identifier (URI). Thus, pattern-based service bus 14 maintains a database (described below) that assigns and maintains mapping of each bus participant to a URI address space. This identification is used by pattern-based service bus 14, along with information concerning the type of interactions employed by the bus participant and the type of action/event instances (e.g., Type information) expected by the bus participant to determine the invocation/delivery of action instances from/to each bus participant.

Bus-Implemented Patterns

Bus-implemented patterns are implemented by pattern-based service bus 14 and define interactions provided between pattern-based service bus 14 and bus participants 12. A benefit of this arrangement is it simplifies and standardizes interactions between bus participants 12 and pattern-based service bus 14 by implementing interactions on the service bus side, rather than the bus participant side. Although a plurality of bus-implemented patterns are described below, it is understood that various other patterns may be employed based on the application to satisfy various interaction requirements between pattern-based service bus 14 and bus participants 12a-12g. In an exemplary embodiment, pattern-based service bus 14 implements the following basic patterns or activities:

Address Space Management
Event Delivery
Durable Event Delivery
Action Invocation
Pending Action Invocation
Command Invocation
User Action Invocation
Data Publishing
Configuration Management For example, a bus participant that wishes to invoke an action would use an action invocation pattern provided by pattern-based service bus 14. A bus participant that performs an action would use a delivery pattern provided by pattern-based service bus 14 to receive an invoked action.

As described in more detail below, address space management patterns provide bus participants with access to the logical organization of all bus participants. In particular, the address space management patterns allow bus participants to register and unregister bus participants and to receive notifications about address space changes. Event delivery and durable event delivery patterns allow one or more bus participants to publish events to bus-patterned service bus 14 and allow bus participants to receive published events. In particular, durable event delivery patterns allow data published by a bus participant to be retained and subsequently delivered to bus participants that have subsequently joined patterned-based service bus 14. Action invocation, pending action invocation and command invocation patterns allow bus participants to advertise actions that can be performed by action providers and allows action consumer to invoke those actions. Data publishing patterns allow bus participants to publish a data item via data publishing provider 37 onto the bus and allows bus participants to query bus-patterned service bus 14 for published data items via data publishing consumer 36. Configuration management patterns allow bus participants to upload configuration information onto the bus for other bus participants to read configuration information and receive notifications. Each of the above-identified patterns is discussed in additional detail below. In other embodiments, various other patterns may be implemented by pattern-based service bus 14 to meet application requirements.

Each of the patterns described above is implemented by pattern-based service bus 14. As a result, interactions are constrained to interactions between a bus participant and pattern-based service bus 14. This is in contrast with systems employing typical service buses, in which an interaction is defined between a service consumer and a service provider, and the service bus acts only to route the message between consumer and provider. Benefits of utilizing pattern-based service bus 14 to perform activities rather than individual applications is that more complex interactions may be implemented. For example, data published by bus participants 12a may be stored by pattern-based service bus 14 for an extended duration of time, and delivered to another bus participant 12g connected to bus 14 subsequent to the initial publication of the data. More generally, pattern-based service bus 14 blurs the distinction between a participant being either a service provider or a service consumer, wherein applications are described instead as simply bus participants. A benefit of relying on pattern-based service bus 14 to implement activities on behalf of the plurality of applications is it removes the need to implement activity-specific management logic.

Pattern-based service bus 14 is implemented via a combination of hardware and software. In particular, pattern-based service bus implements a plurality of patterns that define interactions bus participants may have with pattern-based service bus 14. As described in more detail below, pattern-based service bus 14 also includes storage components that allow events, actions, etc. invoked and performed by various bus participants to be stored to persistent memory. In this way, pattern-based service bus 14 manages interactions with bus participants, and stores information associated with those interactions.

Figure 2:
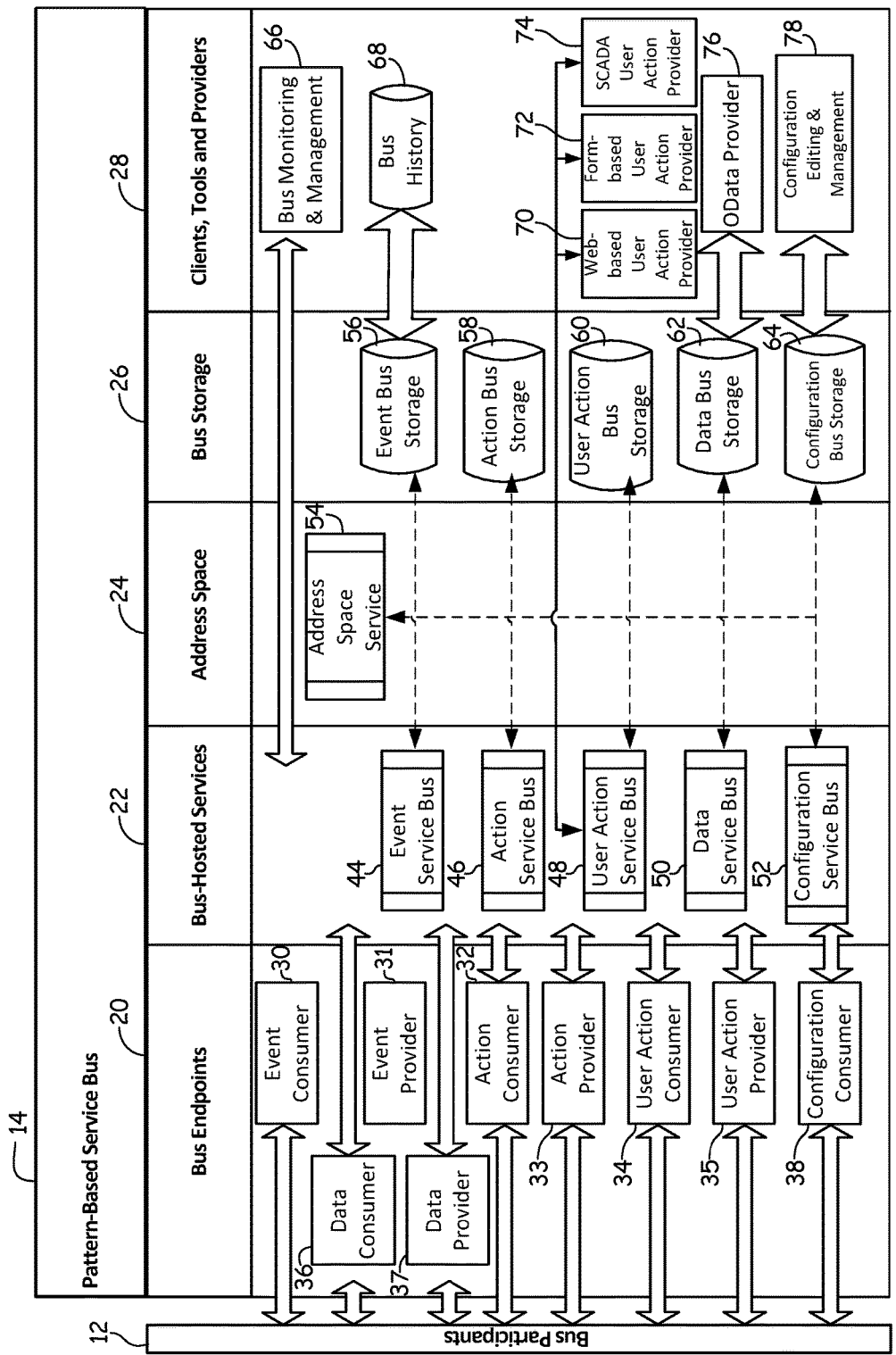
FIG. 2 is a block diagram of a pattern-bus service bus according to an embodiment of the present invention.

FIG. 2 is a block diagram of pattern-based service bus 14 according to an embodiment of the present invention. Although pattern-based service bus 14 includes a combination of hardware and software elements, for purposes of the following discussion pattern-based service bus 14 is described with respect to bus endpoints 20, bus services 22, address space 24, bus storage 26, and clients, tools and providers 28.

Bus Endpoints

Bus participants 12 connect to pattern-based service bus 14 via bus endpoints 20. Each endpoint 20 is defined by a unique registration identifier (URI), identification of bus service 22 to which it is connected, and the type of interaction to be provided by bus service 22. Each bus participant interacts with pattern-based service bus via a particular object type, which may include simple and/or complex data objects. When communicating with pattern-based service bus, an instance of the object type is either provided to or received from the service bus.

Bus endpoints 20 utilize the patterns implemented by pattern-based service bus to initiate different types of interactions with the services bus. For example, action consumer endpoint 32 may utilize action invocation patterns, command invocation patterns, and/or multi-cast command invocation patterns to invoke different types of actions from different bus participants. Similarly, action provider endpoint 33 may utilize synchronous action delivery patterns, asynchronous action delivery patterns and pending action delivery patterns to receive invoked actions from pattern-based service bus 14.

In the embodiment shown in FIG. 2, a plurality of bus endpoints 20 are illustrated, including event consumer 30, event provider 31, action consumer 32, action provider 33, user action consumer 34, user action provider 35, data publishing consumer 36, data publishing provider 37 and configuration consumer 38. Each of the plurality of bus endpoints interacts with one of the plurality of bus services 22, discussed in more detail. In addition, bus endpoints may interact with one or more bus participants 12a-12g (shown in FIG. 1).

Bus-Hosted Services

Bus-hosted services 22 implement the variety of patterns made available by pattern-based service bus 14 to bus participants 20. In the embodiment shown in FIG. 2, bus-hosted services includes event service bus 44, action service bus 46, user action service bus 48, data service bus 50 and configuration service bus 52. For example, event service bus 44 implements patterns to interact with event consumer 30 and event provider 31. Similarly, action service bus 46 implements patterns to interact with action consumer 32 and action provider 33 and user action service bus 48 implements patterns to interact with user action consumer 34 and user action provider 35. Data service bus 50 implements patterns to interact with data publishing consumer 36 and data publishing provider 37. In addition, each bus-hosted service bus 22 interacts with address space 24 to determine the address of various bus participants. Bus-hosted service bus 22 further interacts with bus storage 26, which includes event storage 56, action storage 58, user action storage 60, data storage 62 and configuration storage 64, to store data regarding various events, action, user action and data instances invoked and/or performed by bus participants. Bus-hosted services 22 also interact with clients, tools and providers 28 to provide various bus service management and interaction tools.

Address Space

Address space 24 provides logical organization of all bus endpoints 20 utilized to communicate with one or more bus participants 12a-12g. Address space 24 includes address space bus service 54, which implements patterns that allow the registration of bus participants and provide notifications regarding address space changes. In particular, configuration service bus 52 interacts with address space service bus 54 when adding or removing bus participants 20 from service bus 14.

Bus Storage

Bus storage 26 includes a plurality of storage components for storing information relevant to pattern-based service bus 14. Bus-hosted services 22 interact with bus storage 26 to store information related to events, actions, user actions, etc. invoked and/or performed by bus participants. For example, in the embodiment shown in FIG. 2 bus storage includes event storage 56, action storage 58, user action storage 60, data storage 62, and configuration storage 64. Event storage 56 interacts with event service bus 44 to store information related to event instances (i.e., particular events raised by event consumers) provided or published to service bus 14. Similarly, action storage 58 interacts with action service bus 46 to store information related to action instances provided or published to service bus 14, user action storage interacts with user action service bus 48 to store information related to actions provided or published to service bus 14, data storage interacts with data service bus 50 to store information related to data provided or published to service bus 14 and configuration storage 64 interacts with configuration service bus 52 to store configuration information related to bus participants. A benefit of bus storage 26 and components associated therewith is they provide persistent storage of all events, actions, data, etc., related to operation of patterned-based service bus 14. This allows patterned-based service bus 14 to implement patterns such as durable events, wherein the event is stored in persistent memory (e.g., event storage 56) and may be provided or delivered to event consumers that join service bus 14 subsequent to the event being initially provided or published. In addition, persistent storage allows events, actions, data, etc. provided to service bus 14 to be retrieved at a later time. For example, forensic review of information provided to service bus 14 may be retrieved via bus storage 26.

Clients, Tools and Providers

Clients, tools and providers 28 includes a plurality of tools for accessing pattern-based service bus 14. In the embodiment shown in FIG. 2, clients, tools and providers 28 include bus monitoring and management tool 66, bus history tool 68, web-based user action provider 70, form-based user action provider 72, SCADA user action provider 74, OData provider 76, and configuration, editing and management tool 78. Bus monitoring and management tool 66 allows a user to interface with bus-hosted services 22, to retrieve information regarding bus participants associated with pattern-based service bus 14. This may include information regarding the events, actions, user actions invoked/performed by each bus participant. Bus history 68 interacts with bus storage 26 to retrieve information stored by one of the plurality of storage components. Web-based user action provider 70, form-based user action provider 72 and SCADA user action provider each provide various interfaces to allow a user to interact with bus services 22, and in particular with user action service 48. As discussed in more detail below, one of the patterns implemented by user action service 48 may be to prompt a user for information. The display used to provide this prompt may be implemented by one of web-based user action provider 70, form-based user action provider 72, and/or SCADA user action provider 74. Input provided by a user via one of these interfaces is similarly provided to user action service bus 48.

OData provider 76 interacts with data storage 62 to provide access to data published to pattern-based service bus 14 and stored in persistent memory by data storage 62.

Configuration, editing, and management tool 78 interacts with configuration storage 64 to allow a user to view and edit configuration information associated with pattern-based service bus 14. Configuration consumers subscribing to a particular configuration file or type of configuration file receive updates when a user modifies a configuration file via configuration, editing, and management tool 78.

The operation of pattern-based service bus 14 is described in detail with respect to FIGS. 3-19, which illustrate execution of various patterns made available by pattern-based service bus 14 for implementing invocation and performance of events, actions, user actions, etc., between bus participants 12.

Event Pattern

Pattern-based service bus 14 implements event patterns that allow event providers 31 to publish an event to pattern-based service bus 14 and allow one or more event consumers 30 to receive events from pattern-based service bus 14. Event patterns are implemented by event service bus 44, which interacts with event consumers 30 and event providers 31.

In an exemplary embodiment, event service bus 44 implements three patterns: 1.) sending an event; 2.) sending a durable event; and 3.) receiving an event. Sending an event and sending a durable event define interactions between event service bus 44 and event provider 31. In particular, these patterns allow event provider 31 to publish an event to pattern-based service bus 14 for delivery to subscribing event consumers 30. Sending a durable event allows the event instance to be stored in persistent memory and delivered to action consumers 30 that subsequently join pattern-based service bus 14. Receiving an event defines the interaction between event service bus 44 and event consumer 30.

Event Providers

Event providers 31 are a type of bus endpoint that is responsible for publishing (i.e., originating events) onto pattern-based service bus 14. When connected to pattern-based service bus 14, event provider 31 is assigned a URI within address space 24, identifies the types of events that will be published onto pattern-based service bus 14 and identifies the pattern that will be used to interact with event service bus 44.

As described above, event provider 31 makes use of event patterns made available by event service bus 44 to publish an event to pattern-based service bus 14. Each event published by event provider 31 is referred to as an event instance. Each event instance will include information utilized by event service bus 44 to handle the event. For example, in an exemplary embodiment, each event instance includes: 1.) identification—uniquely identifying the event instance; 2.) source—identification of event provider 31 that triggered the event instance; 3.) output—actual payload carried by the event instance, defined by the event type (e.g., simple and complex types); 4.) result—a string value set by event provider 31 and utilized by event consumer 30 that receive the event instance; and 5.) time stamp—indicating the time the event was initiated.

Event Consumers

Event consumers 30 are a type of bus endpoint that interacts with event service bus 44 to receive events published onto pattern-based service bus 14. When connected to pattern-based service bus 14, event consumer 30 is assigned a URI within address space 24, identifies the types of events that that it will receive from pattern-based service bus 14, and defines event subscriptions, which determine which events are delivered by event service bus 44 to event consumer 30.

Event subscriptions may be defined in a plurality of ways, including by: 1.) event type—in which events of a defined type are delivered to event consumer 30; 2.) entity name—in which events of a type provided by a certain entity are delivered to event consumer 30; 3.) entity type—in which all events of the type from any entity of the entity type will be delivered to event consumer 30; 4.) entity type and event provider name—in which all events of the type from any entity of the entity type when originated by the event provider with the matching name will be delivered to event consumer 30; and 5.) URI—in which all events of the type form the event provider identified by the URI will be delivered to event consumer 30. Based on subscriptions provided by event consumers connected to pattern-based service bus 14, a single event may be delivered to a plurality of event consumers 30.

FIGS. 3-6 illustrate interaction between event consumers 30, event providers 31, event service bus 44, and event storage 56 to implement a variety of interactions.

Figure 3:
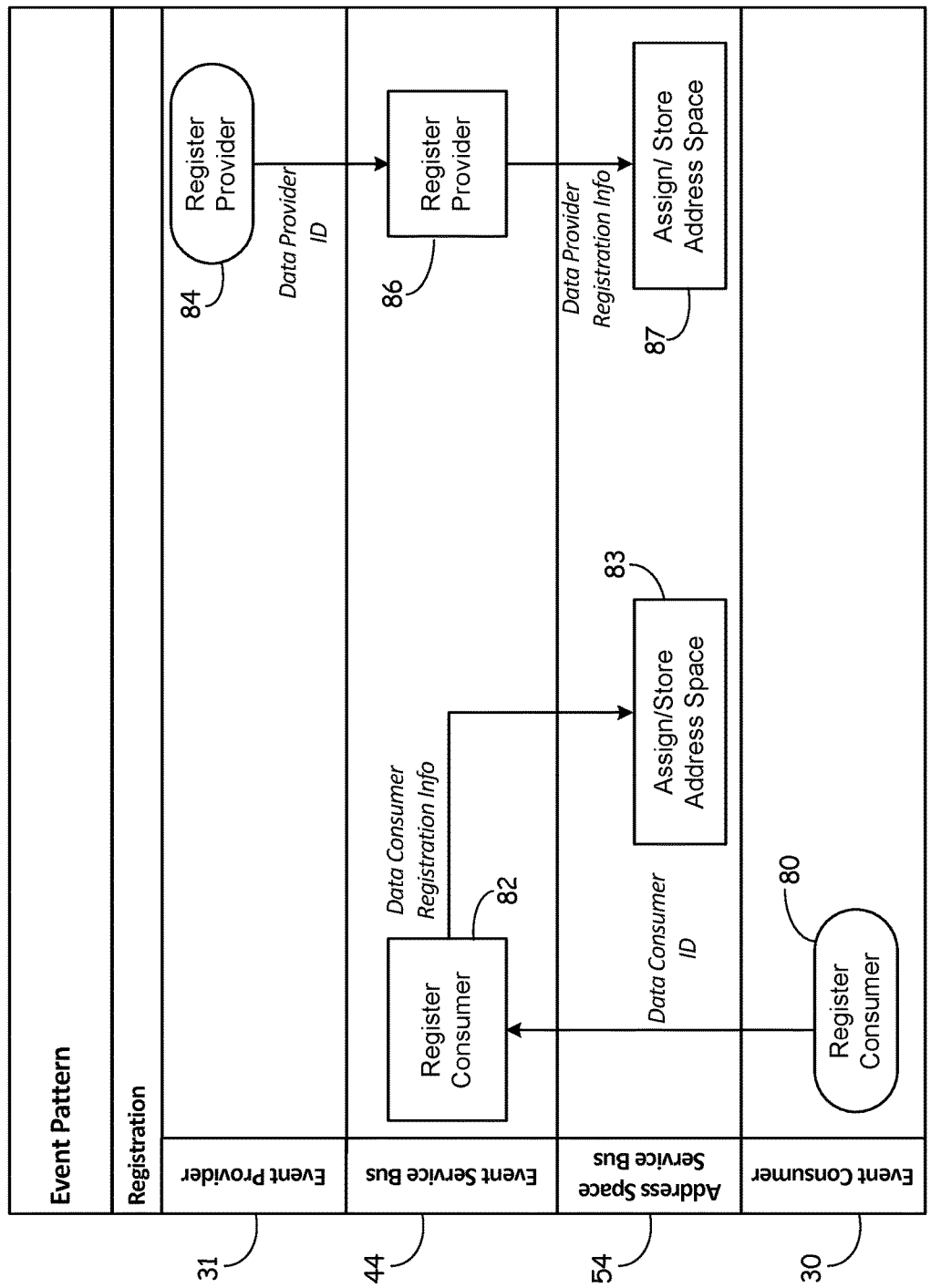
FIGS. 3-6 are block diagrams illustrating various event patterns implemented by the pattern-based service bus according to an embodiment of the present invention.

FIG. 3 illustrates registration of event consumer 30 and event provider 31. Registration of event consumer 30 begins at step 80 by interacting with event service bus 44 and bus address space service bus 54 to register event consumer 30 as a bus participant. In one embodiment, when connected to event bus service 44, event consumer 30 provides identification (address space URI) identifying itself to event bus service 44. At step 82, event bus service 44 collects information regarding event consumer 30, including event types associated with event consumer 30 and subscriptions associated with event consumer 30. At step 83, information collected by event bus service 44 (e.g., address space URI, event type, and subscriptions, etc.) are provided to address space service bus 54 for storage by address space 24.

In an exemplary embodiment, event subscriptions may be defined by event type, entity name, entity type, entity type and event provider name, or by URI as described above. For example, event consumer could subscribe to events invoked by event provider 31 as identified by the URI of event provider 31. Any time event producer 31 invokes an event, identified as originating with event provider 31, that event instance would be delivered to event consumer 30. Subscription by URI results in all events of the correct type provided by a matching event provider being delivered to event consumer 30.

Similarly, registration of event provider 31 begins at step 84 by interacting with event service bus 44 to register event provider 31 as a bus participant. In one embodiment, when connected to event bus service 44, event provider 30 provides identification (address space URI) identifying itself to event bus service 44. At step 82, event bus service 44 collects information regarding event provider 31, including event types to be provided by event provider 31. At step 87, information collected by event bus service 44 (e.g., address space URI, event type, etc.) are provided to address space service bus 54 for storage in address space 24.

Figure 4:
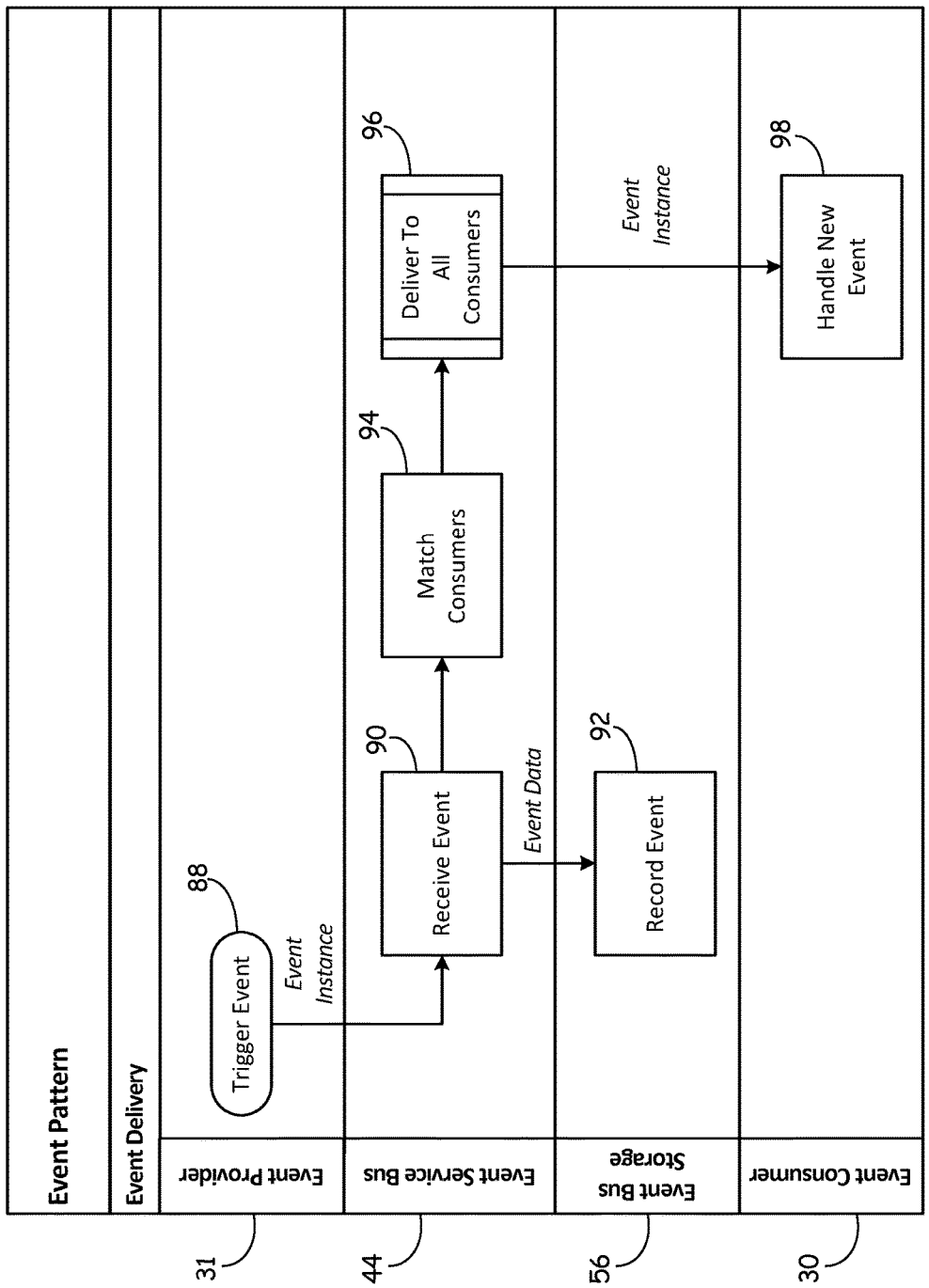

FIG. 4 illustrates use of event patterns implemented by event service bus 44 to publish an event by event provider 31 and deliver the event to event consumer 30. At step 88 an event is triggered by event provider 31. Events can be triggered by bus participants 12a-12g external to pattern-based service bus 14, or may be triggered internally based on activities occurring within pattern-based service bus 14. When an event is triggered, an event instance is created and provided by event provider 31 to event bus service 44. As discussed above, an event instance includes a plurality of fields, such as identification, source, output, result, and time stamp, wherein identification uniquely identifies the event instance, source identifies the event provider that triggered the event, outputs include the payload of the event, and time stamp identifies when the event was triggered.

At step 90, event bus service 44 receives the event instance triggered at step 88. At step 92, event bus service 44 interacts with event bus storage 56 to record the event instance in memory. Storage of an event instance with event bus storage 56 may be temporary (e.g., maintained only until the event has been delivered to all event consumers) or may be persistent in the sense that the event data is maintained even after the event has been delivered to all subscribing event consumers.

At step 94, event bus service 44 matches the event instance provided by event provider 31 with event consumers to determine to which event consumers the event instance should be delivered. Matching an event instance to event consumers is based on event subscriptions associated with each event consumer. As described above, event subscriptions may be based on event type, entity name (e.g., event provider name), entity type, entity type and event provider name, or by URI (as defined in address space). In one embodiment, event service bus 44 maintains a distribution list that identifies all of those event consumers to which a particular event should be delivered. The distribution list is maintained in event bus storage 56, and may be updated with changes in event consumer subscription information.

Based on the results of step 94, at step 96 event bus service 44 delivers the event instance to all subscribing event consumers. In the embodiment shown in FIG. 4, an event instance is illustrated being provided to event consumer 30, although it should be recognized that a plurality of event consumers may receive the same event instance if each is matching subscriber. Event service bus 44 may utilize the distribution list to ensure that the same event instance is not delivered to event consumer 30 more than one time. That is, delivery of a particular event instance may be checked off on the distribution list to indicate that a particular event consumer has received the event instance.

At step 98, event consumer handles the event instance provided. This may include invoking some action or response from the bus participant connected to pattern-based service bus 14 via event consumer 30. Event completion does not require any additional interaction or response from event consumer 30.

Figure 5:
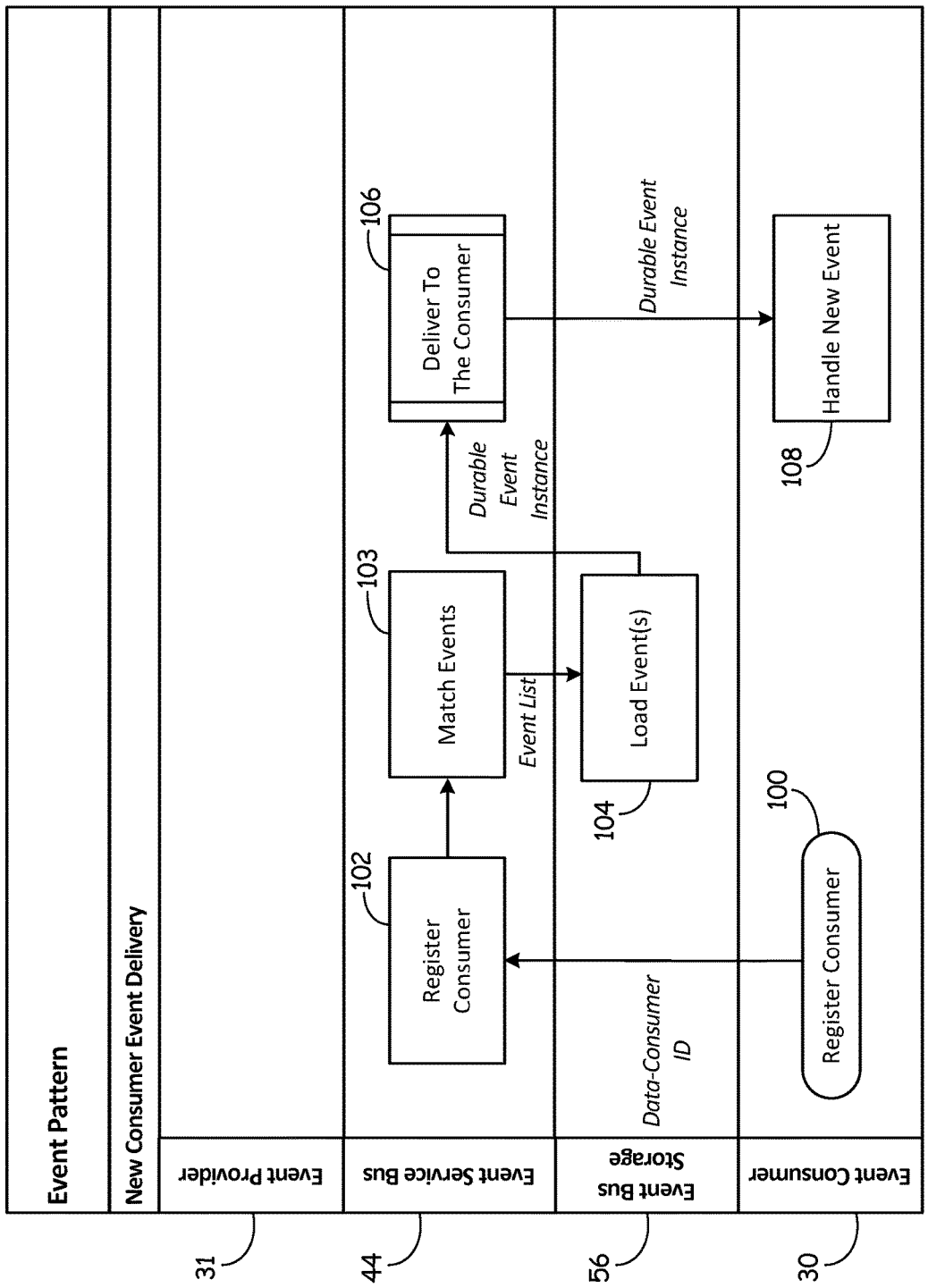

FIG. 5 illustrates use of event patterns implemented by event service bus 44 to register event consumer 30 and deliver a durable event to the newly registered event consumer. In particular, FIG. 5 illustrates a situation in which event consumer 30 is attached to or joins pattern-based service bus 14 subsequent to triggering of an event to which event consumer 30 is a subscriber. Because pattern-based service bus 14 allows for triggering of durable events, however, the event can be delivered even though event consumer 30 is connected after the event is initially published.

Registration of event provider 31 begins at step 100 by interacting with event service bus 44 to register event provider 31 as a bus participant. In one embodiment, when connected to event bus service 44, event consumer 30 provides identification (e.g., URI) identifying itself to event bus service 44. At step 102, event bus service 44 collects information regarding event consumer 30, including event types associated with event consumer 30 and subscriptions associated with event consumer 30. As discussed above with respect to registration of event consumers shown in FIG. 3, event bus service 44 may also interact with address space bus service 54 to store information related to event consumer 30.

At step 103, event bus service 44 matches event consumer 30 to events based on subscriptions provided and stored at step 102 and provides a list of matching events to event bus storage 56. At step 104, event bus storage 56 loads those durable events identified in the provided event list and provides loaded durable event instances to event bus service 44. Durable events, as discussed above, represent those events that were triggered prior to event consumer 30 joining pattern-based service bus 14 and are stored by event bus storage 56 to persistent memory.

At step 106, event bus service 55 delivers received durable event instances to event consumer 30. At step 108, event consumer 30 handles the received event instance. This example illustrates one of the benefits of pattern-based service bus 14, in which providers of services are not required to be aware of event consumers, and in fact, event consumers can be added after the triggering of events by event providers and still receive the triggered events.

Figure 6:
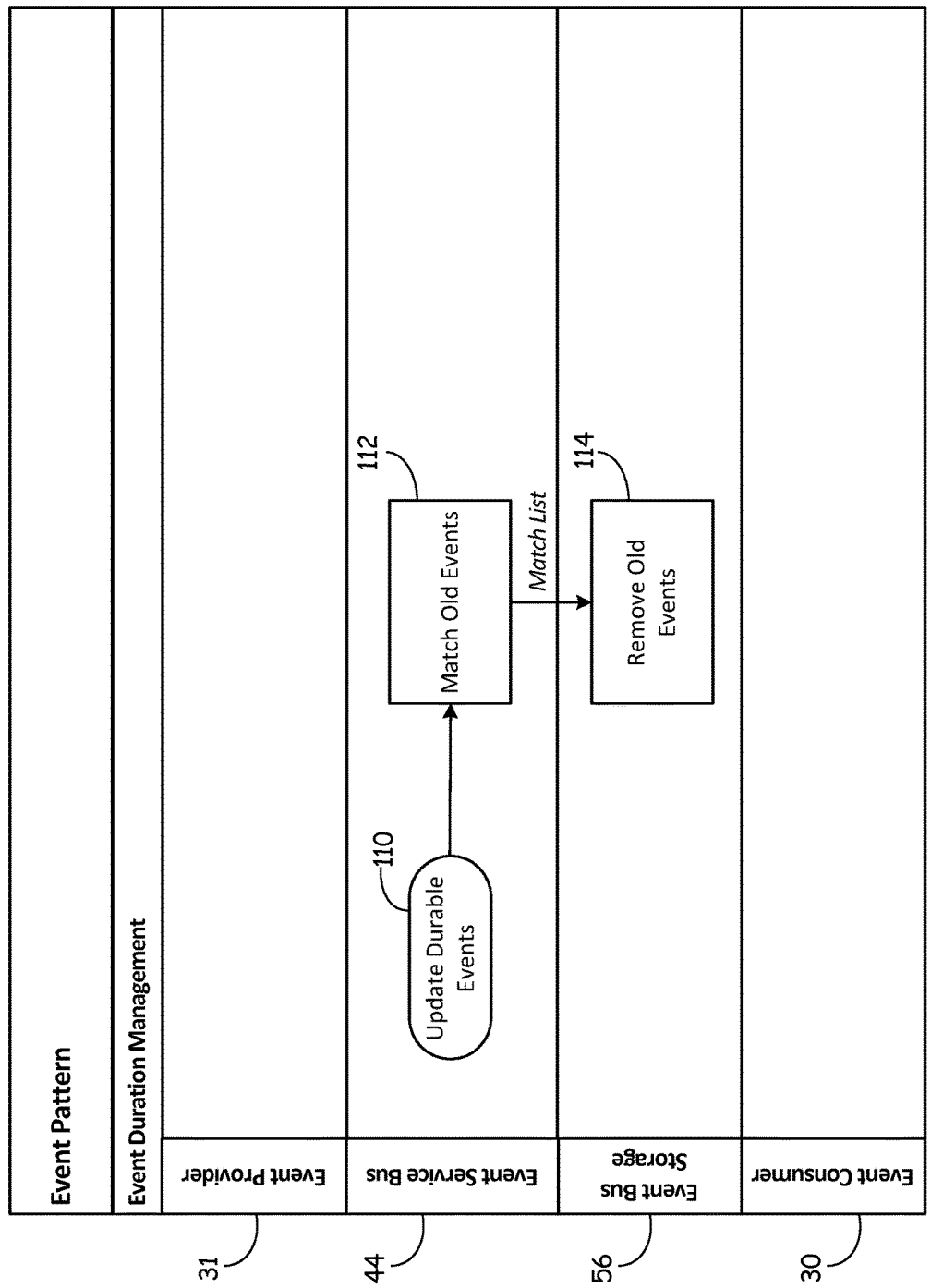

FIG. 6 illustrates use of event patterns implemented by event service bus 44 to manage durable events. At step 110 event bus service 44 starts a process to update durable events, in which old events are removed from persistent storage. At step 112, event bus service 44 determines or matches which durable events are old. This may be based on a duration value stored with respect to each event instance, or may be based on global storage guidelines associated with event instances. Event bus service 44 creates a list of "old" durable events that have expired and provides the match list to event bus storage 56.

At step 114, event bus storage 56 utilizes the match list provided by event bus service 44 to remove from persistent memory "old" durable events, including removing old durable events from event storage component 56.

In this way, the present invention allows event consumers 30 and event producers 31 to interact, without direct knowledge of one another, via pattern-based service bus 14. In particular, patterns implemented by pattern-based service bus 14 allow event instances to be delivered by event producer 31 before a previous event instance has been completed, manages delivery of event instances to event consumers, prevents duplicate delivery via distribution lists stored to persistent memory, allows a single event instance to be delivered to a plurality of event consumers 30, and allows for durable event delivery.

Action Bus Pattern

Pattern-based service bus 14 implements action patterns that allow action providers to advertise action implementations and allow action consumers to invoke actions. In particular, action service bus 46 is implemented as a bus-hosted service that interacts with action consumers 32 and action providers 33.

Action Providers

Action providers 33 are a type of bus endpoint that connects an application-specific implementation (e.g., 12a-12g, shown in FIG. 1) to pattern-based service bus 14 and in particular to action service bus 46. Connecting action provider to action service bus 46 makes the application specific implementation of the action type available to pattern-based service bus 14 for invocation.

As discussed in more detail below, delivery of action instances to action providers may be provided via a plurality of delivery patterns implemented by action service bus 46, including synchronous action delivery in which an action provider supports one invocation at a time; asynchronous action delivery in which the action provider supports concurrent invocations; and pending action delivery in which the action provider polls a list of pending actions from action service bus 46 and selects a pending action to implement. One benefit of the present invention is that delivery patterns are implemented by action service bus 46 and therefore do not require special application-side handling of actions. For example, for an action provider that supports synchronous delivery, action bus service 46 handles queuing of action instances for subsequent delivery to an action provider that is currently processing an action, or directs the action instance to a different action provider.

Action Consumers

Action consumers 32 are a type of bus endpoint that invoke actions provided by application-specific implementations provided by action providers 33 and made available by action service bus 46. The actions invoked by a particular action consumer 32 are determined based on an action subscription associated with each action consumer 32, wherein action subscriptions may be based on action type, entity name, entity type, entity type and action provider name, or by URI. That is, action consumer 32 can invoke an action by subscribing to the URI of a particular action provider 33, or may merely subscribe to the action type to be performed without specifying the particular action provider 33 to perform the action.

As with the action delivery patterns implemented by action service bus 46 for delivery actions to action providers, action service 46 manages a plurality of action invocation patterns. In one embodiment, action invocation patterns include a normal action pattern in which action consumer 32 submits an action instance to action service bus 46, a command pattern in which action consumer 32 submits an action instance to action service bus 46 but does not require results associated with action performance, and multicast command pattern in which action consumer 32 submits an action instance to action service bus 46 for delivery to all matching action providers but does not require results associated with action performance.

Action Instances

Actions are identified by type, which may include a combination of simple and/or complex data types supported by the implementation logic of the action (e.g., .Net, Java, etc.). In an exemplary embodiment, each action instance invoked on pattern-based service bus 14 includes the following fields:

Identification—uniquely identifying each action instance,
Source—URI of the action consumer that requested the action instance;
Target—URI of the action provider that will perform the work on behalf of the action instance;
Inputs—actual payload carried by the action instance, defined by the concrete implementation of the derived event type,
Result—string value that is used by the action consumers when evaluating the result of action execution, wherein the result is set by the action provider;
Start time stamp—UTC time stamp of the action originated from an action consumer
End time stamp—UTC time stamp of the action completion by an action provider.

FIGS. 7-13 illustrates interactions between action consumers 32, action providers 33, action service bus 46, and action storage bus 58 to invoke and delivery actions between action consumers and action providers. In particular, the figures illustrate execution of action bus patterns to perform activities such as registering action providers and action consumers, invoking actions, delivering invoked actions, delivering delayed action invocations, handling failed action invocation, command invocation, and multicast command invocation.

Figure 7:
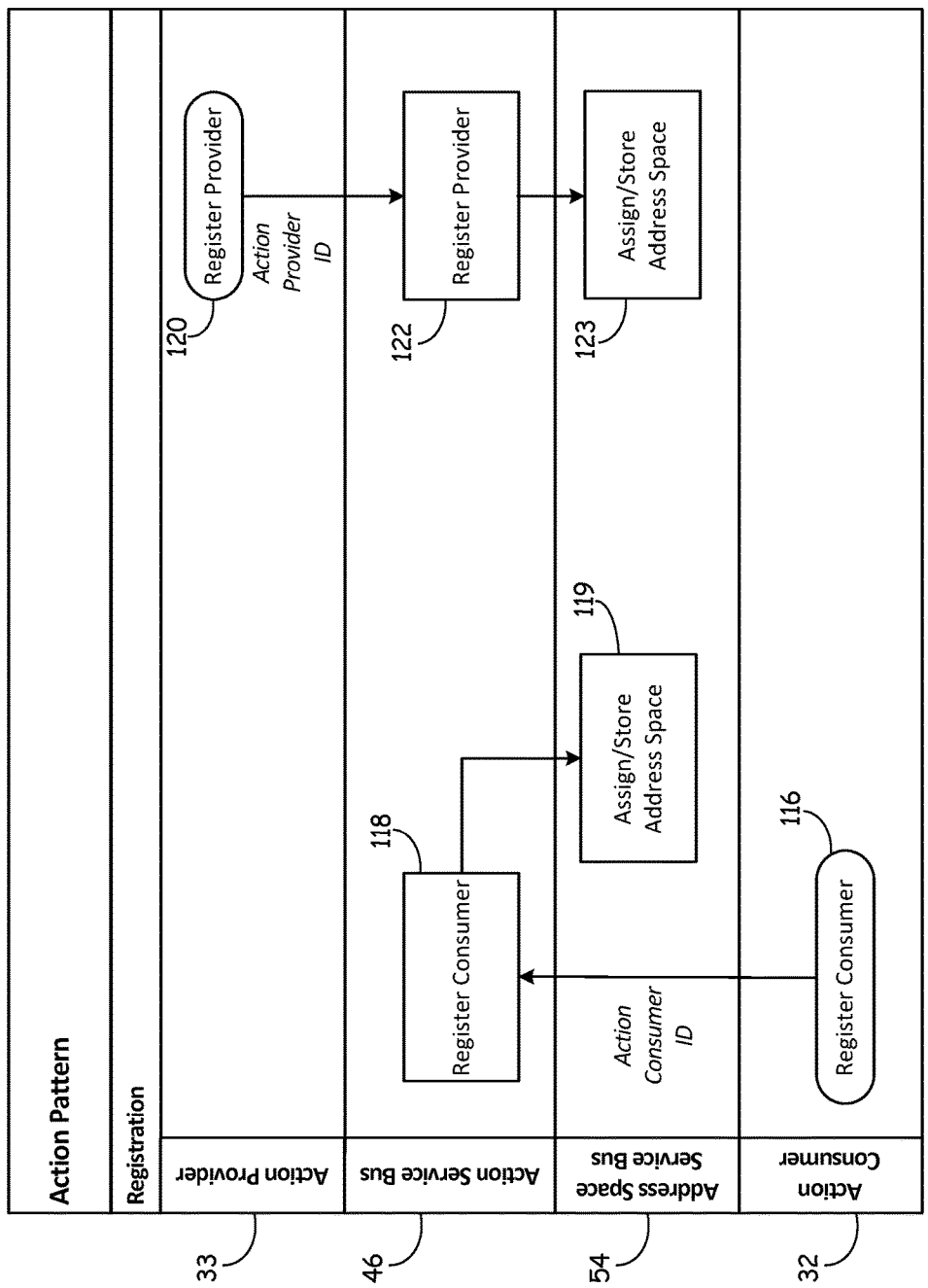
FIGS. 7-13 are block diagrams illustrating various action bus patterns implemented by the pattern-based service bus according to an embodiment of the present invention.

In the embodiment shown in FIG. 7, action consumer 32 and action provider 33 are registered with bus-pattern service bus 14. The registration of action consumers 32 and action providers 34 is similar to the registration of event consumers 30 and event providers 31. At step 116 action consumer 32 is connected to pattern-based service bus, and interacts with action bus service 46 and bus address space service bus 54 to register action consumer 32. In the embodiment shown in FIG. 7, action consumer provides identifying information to action bus service 46 that includes subscription information indentifying those actions to be invoked by action consumer 32. At step 119, action bus service 46 interacts with address space service bus 54 to store information identifying action consumer 32, including the URI assigned to action consumer 32 by address space service bus 54.

In one embodiment, action subscription may be set to a plurality of different types, such as action type, entity name, entity type, URI, or a combination thereof. For example, subscription by action type indicates that any action provider of the same type can perform the action. Subscription by entity name restricts performance only to those entities matching the entity name, whereas subscription by entity type restricts action performance to those entities of the same type regardless of entity name. Subscription by URI restricts performance of invoked action only to the action provider residing at the subscribed URI.

Action consumers 32 may also designate the action invocation pattern to be utilized in invoking actions. As discussed above, action invocation patterns may include a normal action pattern in which action consumer 32 invokes an action and anticipates a response, command pattern in which action consumer 32 invokes an action for performance by an action provider of a matching type (i.e., correct subscription) but does not expect a response, and multi-cast pattern in which action consumer 32 invokes an action for performance by a plurality of action providers.

Similarly, at step 120 action provider 33 is connected to pattern-based service bus 14, and interacts with action bus service 46 and bus address space service 54 to register action provider 33. In the embodiment shown in FIG. 7, action provider 33 provides identifying information to action bus service 46, including information about data types to be accepted by action provider 33. At step 123, action service bus 46 interacts with address space service bus 54 to store information identifying action provider 33, including the URI assigned to action provider 33 by address space service bus 54.

Action provider 33 also indicates to action service bus 46 a designated delivery pattern. For example, in one embodiment action service bus 46 implements action delivery patterns that include synchronous action delivery, asynchronous action delivery, and/or pending action pattern. Although implemented by action service bus 46, different action providers 33 may utilize different action delivery patterns.

Figure 8:
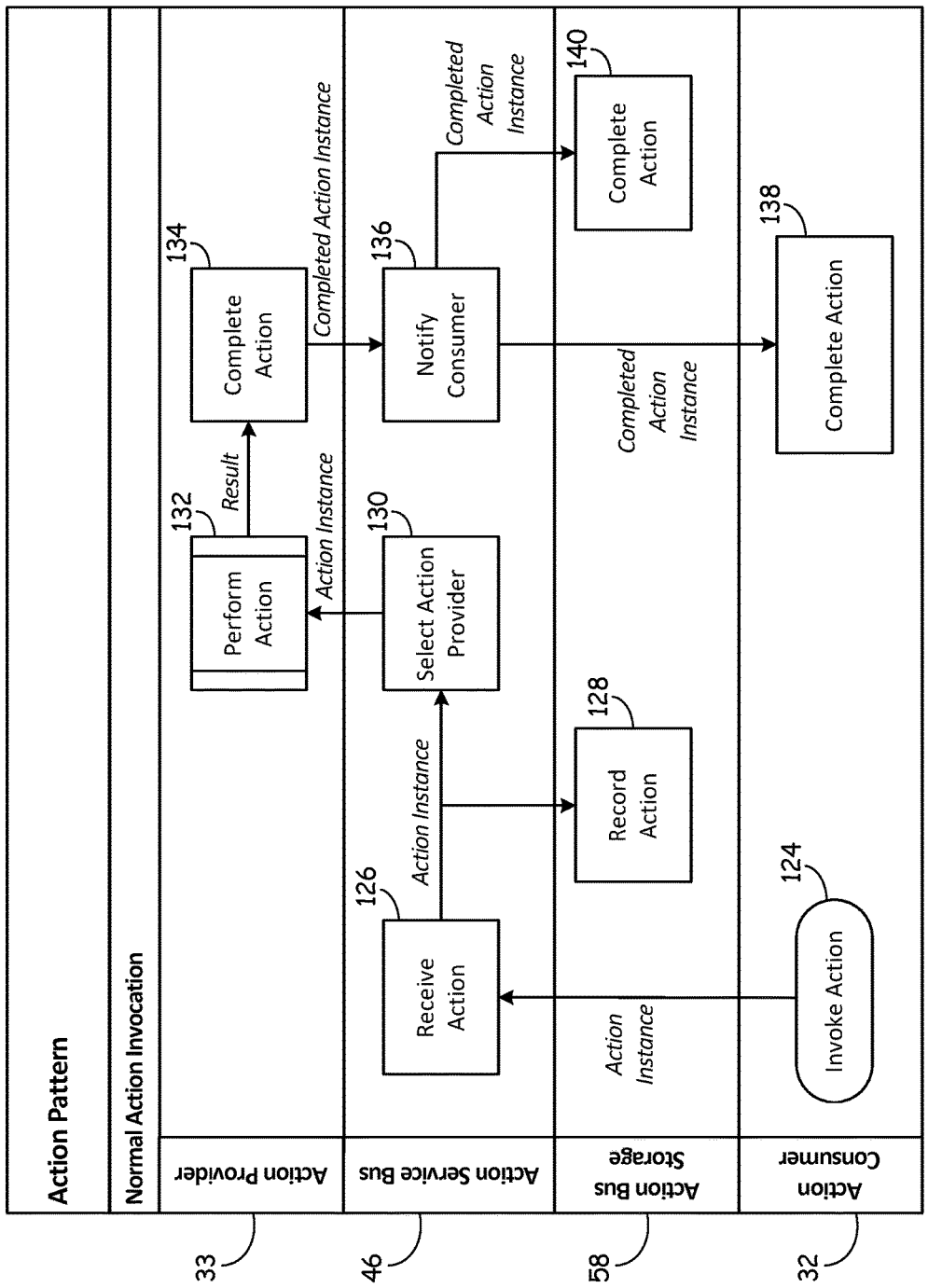

FIG. 8 illustrates use of action patterns implemented by action service bus 46 to handle action invocation according to an embodiment of the present invention. At step 124, action consumer 32 invokes an action by submitting an action instance to action bus service 46. In one embodiment, the action instance includes an identification field, a source field identifying the action consumer requesting the action, and a payload or data carried by the action instance to the action implementation. Action instances may additionally include other fields such as a target field that provides the URI of the action provider that performed the work, payload or data carried by the action instance from the action implementation, and a result string that allows action consumers to evaluate the result of action execution, although these fields may be empty upon initial invocation of the action instance between action consumer 32 and action bus service 46.

In addition, in one embodiment action consume 32 controls the duration of the total time allowed for action instance execution using a timeout value included in the action instance. The timeout value may be set to never, zero or any positive value. For example, the timeout value is set to never if the action instance should remain active regardless of time pending, or to a positive value that describes how long the action instance should remain action. If the timeout value is exceeded, then action bus service 46 removes the pending active instance and notifies action consumer 32 that the action invocation failed.

At step 126, action bus service 46 receives an action instance, thereby transferring responsibility for performing the action and returning results to action service bus 46. However, as soon as action consumer 32 has transferred responsibility to action service bus 46, action consumer 32 is able to submit new actions, even if the previous action invocation has not yet completed.

At step 128, action service bus 46 interacts with action storage bus 58 to store the received action instance to persistent memory. A benefit of storing the action instance to persistent memory is in the event service is interrupted, action invocation may be retrieved from persistent memory by retrieving the action instance, thereby improving the reliability of action invocation.

At step 130, action service bus 46 selection an action provider to implement the invoked action instance. Because action consumer 32 is not aware and does not directly invoke or call action providers, action service bus 46 is responsible for selecting an action provider to implement the invoked function. Action service bus 46 utilizes subscription information associated with action consumer 32 to determine those action providers 33 available to perform the invoked action instance. In some embodiments, more than one action provider may be capable of performing the invoked action, in which case action service bus 46 selects one of the plurality of action providers 33. In selecting one of the plurality of action providers, action service bus 46 may account for pending actions provided to the plurality of action providers and select an action provider 32 to maintain load balancing among the plurality of action providers to optimize instance execution time. The algorithm used to provide load balancing may be based on information regarding actions previously assigned to each of the action providers or may be based on information regarding pending actions associated with each action provider.

At step 132, action service bus 46 provides the action instance to the selected action provider 33 to perform the action. Action provider 33 processes the received action instance and performs the action subscribed to by action consumer 32. Actions performed by action provider 33 may be performed synchronously or asynchronously, but in the embodiment shown in FIG. 8 are performed asynchronously in response to the action instance provided by action service bus 46. Performance of the action typically generates results that are used at step 134 by action provider 33 to complete performance of the action. Action completion at step 134 includes associating results and/or other outputs with the action instance for evaluation by action consumer 32. Alternatively, as described with respect to FIG. 11 below, action consumer may alternatively invoke commands that do not require action provider 33 to provide action consumer 32 with a response.

At step 136, the completed action instance is communicated to pattern-based service bus 14. In the embodiment shown in FIG. 8, the completed action instance is provided to action service bus 46, which is responsible for notifying action consumer 32 at step 136 and storing the completed action instance to action storage bus 58 at step 140. Storing the completed action instance to action bus storage 58 maintains in persistent memory a record of the action performed. In one embodiment, the completed action instance provided to action consumer 32 at step 138 includes in the result field a string value, provided by action provider 33, which is used by action consumer 32 to evaluate the result of action execution. For example, action provider 33 may indicate in the results field that the action was either "Completed" or "Not Completed". The returned results may be utilized by action consumer 32 to determine the effect of the performed action or determine whether the action has been successful.

Figure 9:
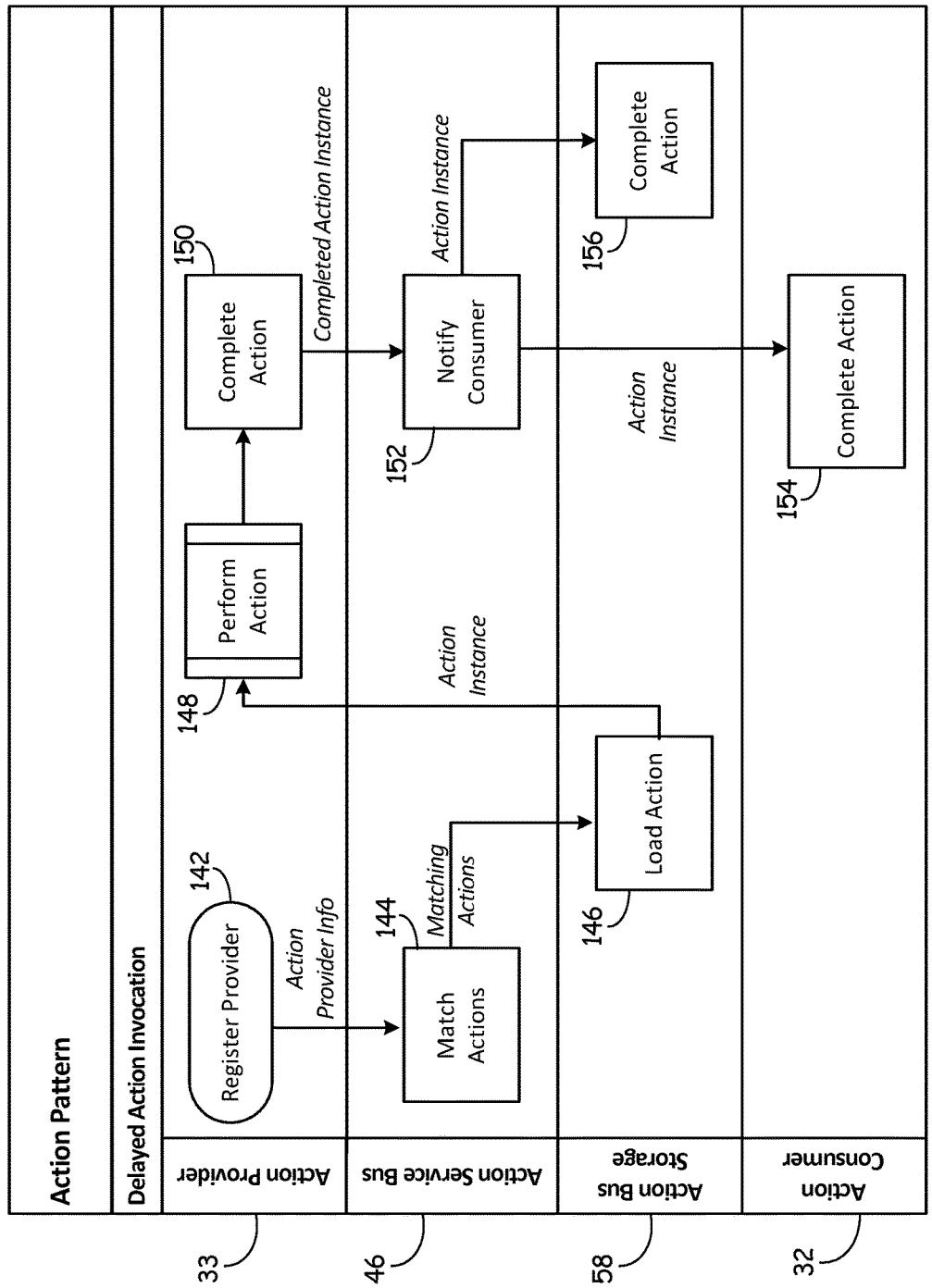

FIG. 9 illustrates delayed action invocation implemented by action service bus 46. At step 142, action provider 33 joins pattern-based service bus 14. As discussed with respect to FIG. 7, action providers join pattern-based service bus 14 by interacting with action service bus 46. This may include providing action provider identifying information to action service bus 46, including information about data types to be accepted by action provider 33. Although not shown in FIG. 9, information provided to action service bus 46 would be stored in persistent memory provided by action bus storage 58.

In the embodiment shown in FIG. 9, at step 144 action service bus 46 matches the action performed by newly registered action provider 33 to pending actions (i.e., actions awaiting performance). Matching actions are provided to action bus storage 58, which utilizes the list of matching actions to provide one or more action instances to action provider 33 for performance. In this way, action invoked prior to the connection of action provider 33, may nonetheless be performed by action provider 33 once connected to pattern-based service bus 14. As discussed above, this type of delayed invocation is allowed because action consumers do not make direct calls to action providers, but rather, invoke action via action service bus 46.

At step 148, action provider 33 performs action instances provided by action bus storage 58. Based on the delivery pattern (e.g., synchronous, asynchronous, pending), action service bus 46 manages the delivery of actions instances. For example, if action provider 33 supports synchronous invocation, then action service bus 46 manages concurrency issues that may arise from more than one action being invoked for performance by action provider 33. In contrast, if action provider 33 supports asynchronous invocation, then action service bus 46 delivers all action instances to action provider 33, which allows for concurrent invocation of actions.

At step 150, action provider 33 completes the action and provides a completed action instance to action service bus 46, which is responsible for notifying action consumer 32 at step 152 and storing the completed action instance to action storage bus 58 at step 156. Storing the completed action instance to action bus storage 58 maintains in persistent memory a record of the action performed. In one embodiment, the completed action instance provided to action consumer 32 at step 152 includes in the result field a string value, provided by action provider 33, which is used by action consumer 32 to evaluate the result of action execution. For example, action provider 33 may indicate in the results field that the action was either "Completed" or "Not Completed". The returned results may be utilized by action consumer 32 to determine the effect of the performed action or determine whether the action has been successful. At step 154 the action is completed.

Figure 10:
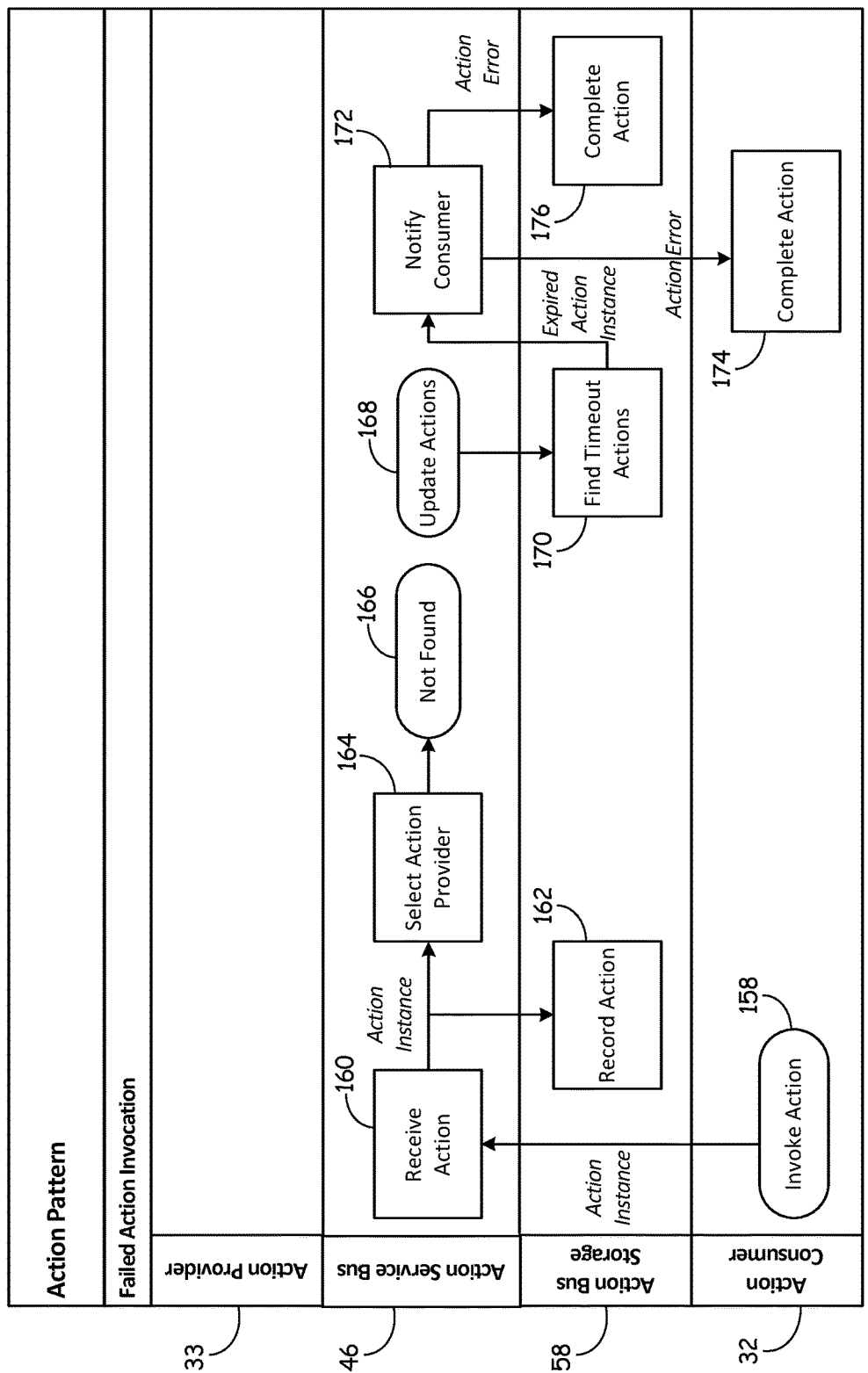

FIG. 10 illustrates handling of a failed action invocation by action service bus 46. At step 158, action consumer 32 invokes an action. As described with respect to FIG. 8, actions are invoked by submitting an action instance to action bus service 46. Furthermore, action consumer 32 may dictate the duration of total time allowed for action instance execution using a timeout value included in the action instance. The timeout value may be set to never, zero or any positive value. For example, the timeout value is set to never if the action instance should remain active regardless of time pending, or to a positive value that describes how long the action instance should remain active. If the timeout value is exceeded, then action bus service 46 removes the pending active instance and notifies action consumer 32 that the action invocation failed. In the exemplary embodiment shown in FIG. 10, the timeout value is set to a positive value.

At step 160, action service bus 46 receives the action instance invoked by action consumer 32. As discussed with respect to FIG. 8, at step 162 action service bus 46 interacts with action bus storage 58 to store a record of the action instance to persistent memory and at step 164 selects an action provider for performing the action instance. However, in the embodiment shown in FIG. 10, no such action provider can be located and so no action instance is delivered.

Rather than immediately return an error message to action consumer 32, action service bus 46 maintains the action instance as a pending action. If an action provider capable of performing the action invoked by the action instance is added to pattern-based service bus 14, then the action instance is provided via the delayed invocation process described with respect to FIG. 9.

At step 168, pending actions are reviewed to determine whether invoked action instances can be provided to action providers and whether the timeout values of any of the invoked action instances have expired. In particular, at step 170 action service bus 46 interacts with action bus storage 58 to review invoked action instances maintained in persistent storage. Action instances having timeout values that have expired are returned to action service bus 46. At step 172, action service bus 46 notifies those action consumers 32 that invoked action instances that have expired. In the embodiment shown in FIG. 10, an action error message is provided from action service bus 46 to action consumer 32. In other embodiments, the invoked action instance may be provided to action consumer 32 with the results field of the action instance indicating a timeout error. Action service bus 46 similarly provides an action error notification to action storage bus 58 to record in persistent memory the timeout error associated with the action instance. At step 174 the action is completed.

Figure 11:
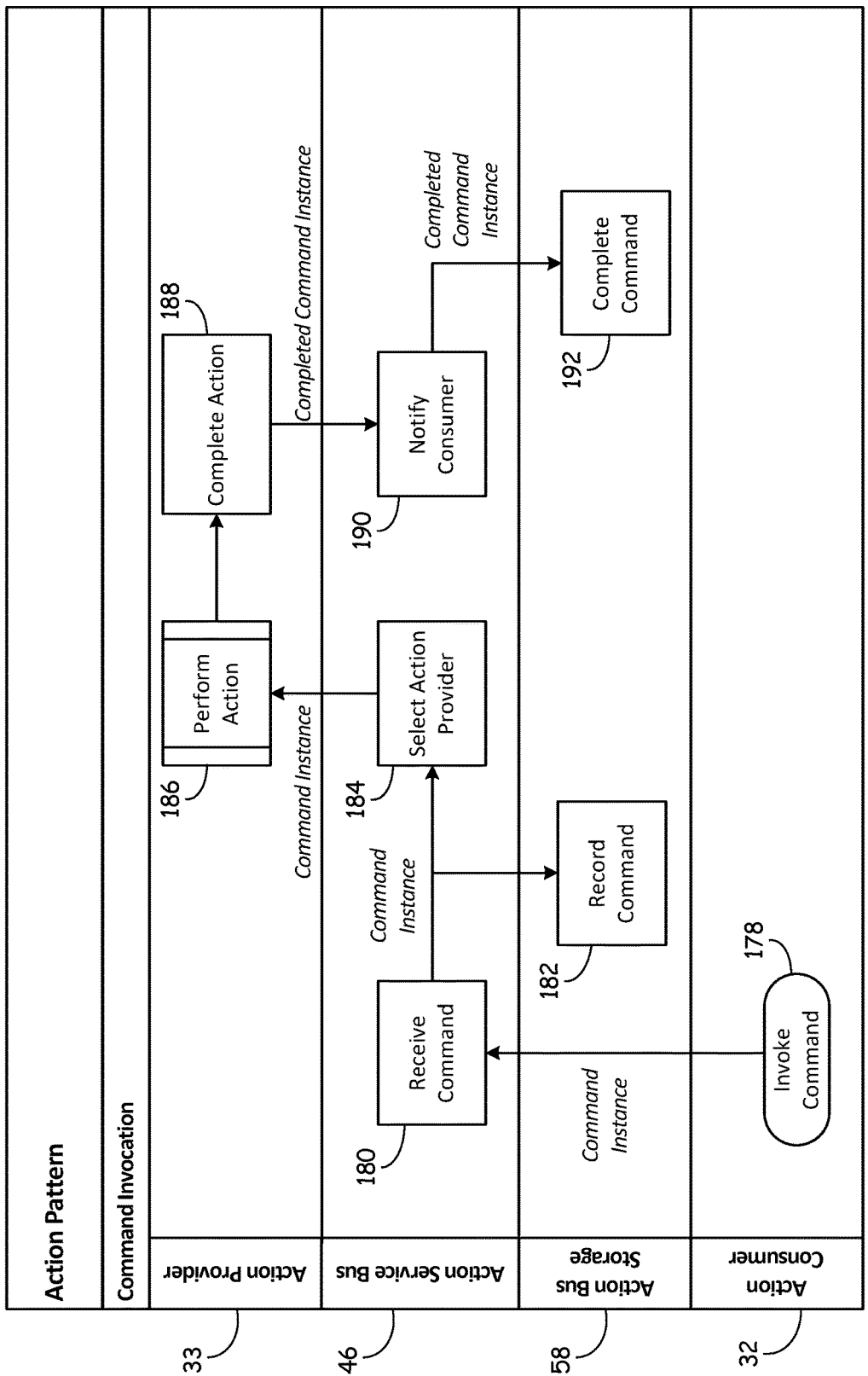

FIG. 11 illustrates use of action patterns implemented by action service bus 46 to handle command invocation according to an embodiment of the present invention. Action consumers may select from a plurality of invocation patterns, including action invocation, command invocation, and multicast command invocation. In the embodiment shown in FIG. 11, action consumer 32 utilizes the command invocation pattern to interact with pattern-based service bus. The type of invocation pattern utilized by action consumer 32 may be determined at the time of joining pattern-based service bus, or may be determined based on the type of action instance provided to action service bus 46. In contrast with invoked actions, invoked commands do not require results be returned to action consumer 32.

In the embodiment shown in FIG. 11, action consumer 32 has already joined pattern-based service bus 14 and identified the type of actions (in this case, a command) that will be invoked by action consumer 32. At step 178, action consumer 32 invokes a command by submitting a command instance to action bus service 46. In one embodiment, the command instance includes an identification field, a source field identifying the action consumer invoking the command, and a payload or data carried by the command instance to the action implementation. Command instances may additionally include other fields such as a target field that provides the URI of the action provider that performed the work, and payload or data carried by the command instance from the action implementation. In contrast with action instances, command instances typically do not include a result string because no result will be returned to action consumer 32. As provided with respect to action instances, command instances may additionally include a timeout value that controls the duration of total time allowed for command instance execution.

To invoke a command, action consumer 32 generates a command instance that is communicated to action service bus 46. At step 180, action service bus 46 receives the invoked command instance, thereby transferring responsibility for performing the invoked command to action service bus 46. As soon as action consumer 32 has transferred responsibility to action service bus 46, action consumer 32 is able to invoke new commands, even if the previous command invocations have not yet completed.

At step 182 action service bus 46 interacts with action storage bus 58 to store the received command instance to persistent memory. A benefit of storing the command instance to persistent memory is in the event service is interrupted, action invocation may be retrieved from persistent memory by retrieving the command instance, thereby improving the reliability of action invocation. Additionally, if no action provider 33 is available to perform the received command instance, storage in persistent memory allows the command instance to be subsequently retrieved and performed by an action provider that joins pattern-based service bus 14.

At step 184, action service bus 46 selects an action provider to implement the invoked command instance. Selection of an action provider is based on subscription information provided by action consumer 32. As discussed with respect to FIGS. 3 and 8, action consumers may define subscriptions by event type, entity name, entity type, entity type and event provider name, or by URI. Based on the subscription information provided by action consumer 32, action service bus 46 selects an action provider 33 to perform the command, and provides the command instance to the selected action provider 33. Action service bus 46 delivers the command instance based on the delivery pattern associated with action provider 33. As discussed above, action provider 33 may selected from a plurality of delivery patterns, including but not limited to: synchronous delivery, asynchronous delivery, and pending delivery patterns. If a plurality of action providers 33 are capable of performing the action, action service bus 46 may implement load sharing algorithms to optimize execution time.

Action provider 33 receives the command instance at step 186 and performs the command requested using application logic implemented by action provider 33. Performance of the command is completed at step 188, and the completed command instance is returned to action service bus 46 at step 190. For performance of an action, action service bus 46 would typically notify the action consumer 32 and provide results. However, for command invocation, action service bus 46 does not provide any notification to the action consumer that invoked the command. Rather, action service bus 46 stores the completed command instance to action bus storage 58 at step 192. As a result, no information is returned to action consumer 32.

Figure 12:
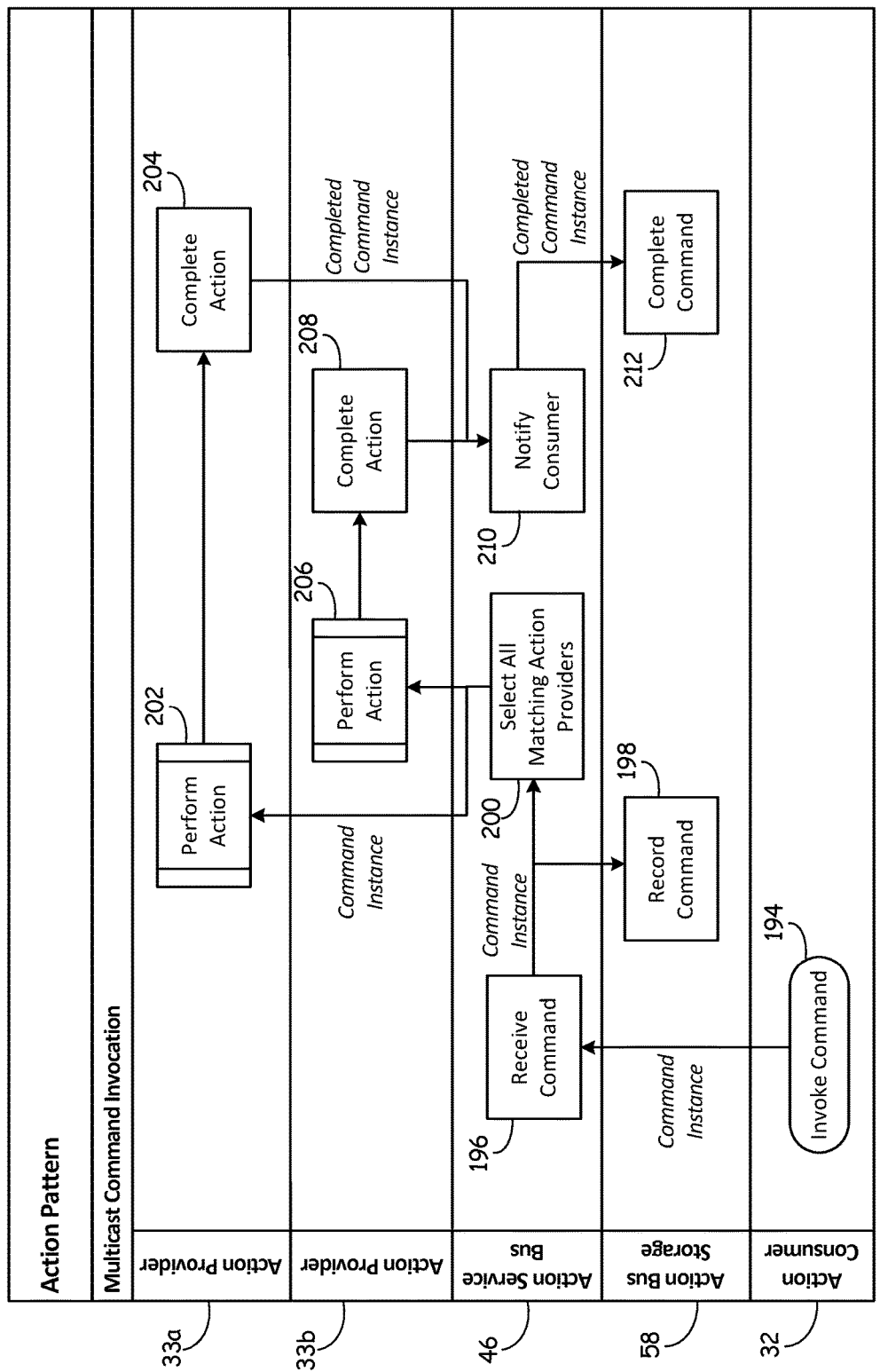

FIG. 12 illustrates use of action patterns implemented by action service bus 46 to handle multi-cast command invocations according to an embodiment of the present invention. Although similar to the command invocation described with respect to FIG. 11, a multi-cast command invocation is provided not just to one matching action provider, but to all matching action providers. Multi-cast command invocations do not require results be returned to action consumers.

Once again, because action consumer 32 is not aware and does not directly invoke or call action providers, action service bus 46 is responsible for matching the invoked multi-cast command with the correct action providers. Action service bus 46 utilizes subscription information associated with action consumer 32 to determine those action providers 33 available to perform the invoked multi-cast command. However, rather than select one action provider 33 to perform the invoked action, action service bus 46 is responsible for delivering the invoked multi-cast command to all matching action providers 33.

In the embodiment shown in FIG. 12, action consumer 32 invokes a multi-cast command by submitting an action instance to action service bus 46 and indicating that the action instance should be invoked as a multi-cast command. Action consumer 32 may also indicate the duration of total time allowed for action instance execution using a timeout value associated with the submitted action instance. Timeout values may once again be set to never, zero, or any positive value. Upon submitting action instance to action service bus 46, responsibility for completing the action transfers to action service bus 46 and action consumer 32 is able to submit additional action instances, even if performance of the previously submitted multi-cast command has not completed.

At step 196, action service bus 46 receives the invoked action instance and recognizes that the action instance has been invoked as a multi-cast command. At step 198, action service bus 46 interacts with action bus storage 58 to store the invoked multi-cast command to persistent memory. At step 200, action service bus 46 matches the invoked multi-cast command to all matching action providers. As described previously, action consumers may define subscriptions by event type, entity name, entity type, entity type and event provider name, or by URI. Based on the subscription information provided by action consumer 32, action service bus 46 selects all those action providers matching the subscription provided by action consumer 32. For example, the subscription provided by action consumer 32 may identify a particular event type such as "start machine". In this example, there may be a plurality of action providers 33a, 33b matching this event type, wherein action service bus 46 would select both action providers 33a, 33b to perform the action "start machine". Thus, at step 200, action service bus 46 provides multi-cast command instances to both action provider 33a and action provider 33b. Delivery of the multi-cast command instance to each action provider 33a and 33b may vary depending on the delivery patterns associated with each. For example, action provider 33a may utilize an asynchronous delivery pattern, whereas action provider 33b may utilize a synchronous or pending delivery pattern.

At steps 202 and 206, action providers 33a and 33b, respectively, perform the requested actions. In the example provided above, this may include starting machines associated with each action provider. At steps 204 and 208 actions are completed by action providers 33a and 33b, respectively, with results provided to action service bus 46. Normally, action service bus 46 would provide results of the performed action to action consumer 32, but as with command invocations, no results are returned from performance of a multi-cast command. At steps 210, action service bus 46 completes provides action results to action bus storage 58 to store in persistent memory the result of the multi-cast command.

Figure 13:
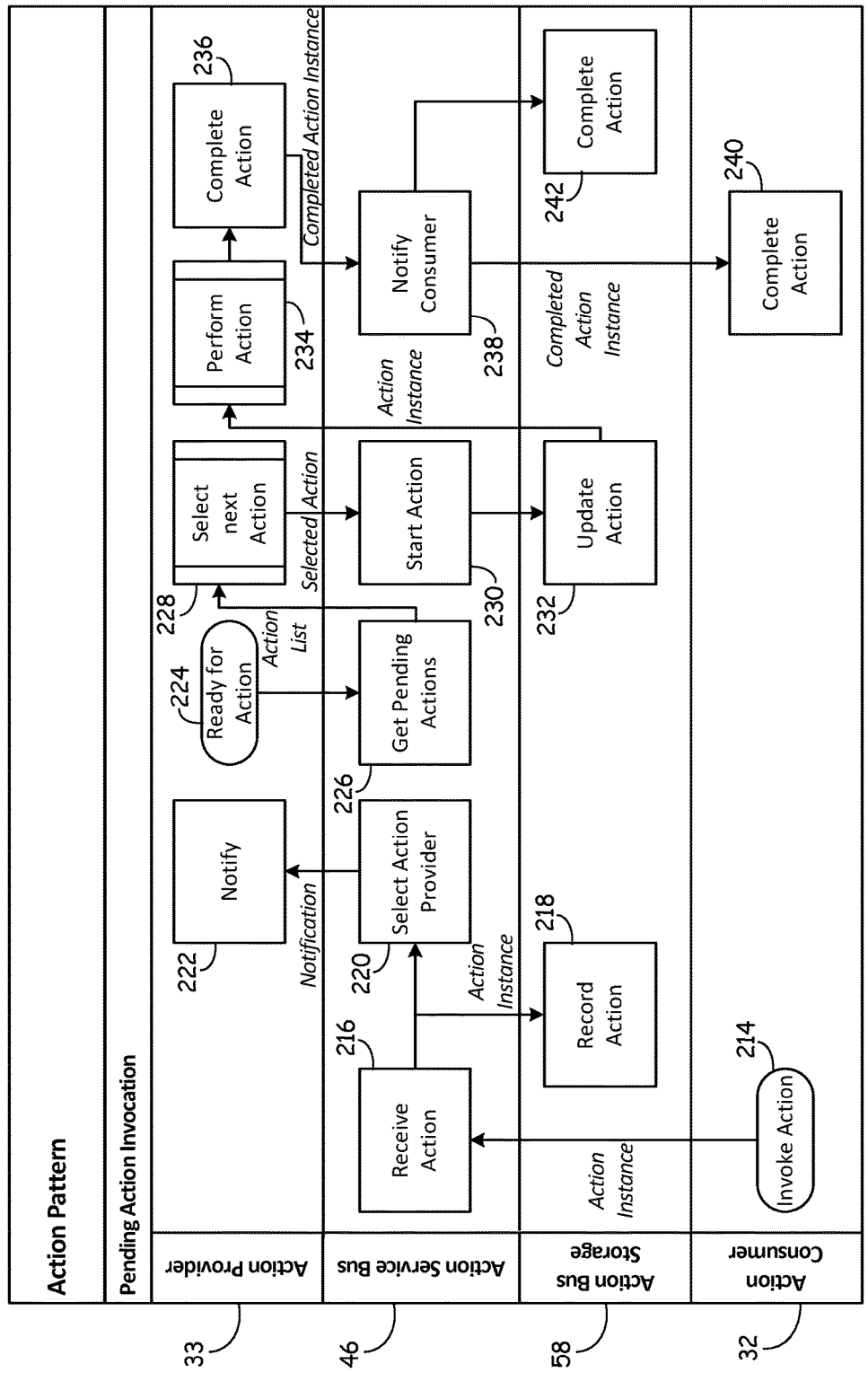

FIG. 13 illustrates use of action patterns implemented by action service bus 46 to handle pending action invocations according to an embodiment of the present invention. As discussed previously, action providers utilize one of a plurality of delivery patterns for receiving action instances from action service bus 46. In the embodiment shown in FIG. 13, action provider 33 does not support direct invocation by action service bus 46. Rather, action provider 33 requests action service bus 46 to maintain a list of pending actions that action provider 33 can poll from and select for performance.

In the embodiment shown in FIG. 13, action consumer 32 invokes an action at step 214 by interacting with action service bus 46 to submit an action instance. At step 216, action service bus 46 receives the action instance and at step 218 interacts with action bus storage 58 to store the action instance to persistent memory. Based on the subscriptions associated with action consumer 32, action service bus at step 220 selects one or more action providers for performing the invoked action. At step 22, action service bus 46 interacts with action provider 33 to notify action provider 33 of a pending action. In contrast with other embodiments, in which either an asynchronous or synchronous delivery pattern is utilized by action provider 33 and action service bus 46 directly invokes action provider 33 by providing the action instance, in the embodiment shown in FIG. 13 action service 46 only provides a notification of a pending action to action provider 33.

At step 222, action provider 33 receives the notification but does not perform the action. At a subsequent time (perhaps, immediately subsequent to step 222), action provider 33 is ready to perform an action. At step 224, action provider 33 interacts with action service bus 46 to request a list of pending actions from action service bus 46. Action service bus 46 receives the request from action provider 33, and at step 226 retrieves a list of pending actions awaiting performance by action provider 33. The list may include actions assigned only to action provider 33, or may include actions that may be performed (according to subscriptions associated with the action consumers that invoked the actions) by other action providers. Having retrieved pending actions at step 226, action service bus 46 interacts with action provider 33 to deliver a list of pending actions available for performance by action provider 33. Once again, the actual action instances are not provided to action provider 33, only a list of pending action instances that may be performed by action provider 33.

At step 228, action provider 33 selects an action to perform and interacts with action service bus 46 to indicate the action instance selected for performance. At step 230, action service bus 46 receives the selection from action provider 33 and starts the action. In particular, at step 232 action service bus interacts with action bus storage 58 to retrieve the action instance to be performed and update the status of the action instance in action bus storage 58. Having retrieved the action instance to be performed, action bus storage 58 interacts with action provider 33 to deliver the selected action instance to action provider 33.

At step 234, action provider 33 performs the action. At step 236, action provider 33 interacts with action service bus 46 to complete the action, which may include modifying the action instance to include results of the action performed. At step 238, action service bus 46 interacts with action bus storage 58 to store the completed action instance to persistent memory and with action consumer 32 to deliver the completed action instance to action consumer 32. At steps 240 and 242, the action instance is completed.

User Action Bus Pattern

Pattern-based service bus 14 implements user action patterns that allow user action providers to advertise a user action implementations and allows user action consumers to invoke user actions. In particular, user action service bus 48 is implemented as a bus-hosted service that interacts with user action consumers 34 and user action providers 35. In contrast with actions described with respect to FIGS. 7-13, user actions are defined as activities performed by a user that cannot be invoked directly. User Action bus patterns allow pattern-based service bus 14 to interact with users with the expectation that users will perform the actions when requested to do so. In one embodiment, user action bus patterns utilize uses roles and user IDs to control who can perform a user action and maintain records of who does perform a particular user action. For example, user action bus patterns may allow only people with matching roles and/or a specific user ID to perform a particular user action.

User Action Providers

User action providers 35 are a type of bus endpoint that connects an application specific implementation (e.g., 12a-12g, shown in FIG. 1) to pattern-based service bus 14 and in particular to user action service bus 48. Connecting user action provider to user action service bus 48 makes the application specific implementation of the user action type available to pattern-based service bus 14 for invocation. Each user action provider 35 connected to user action service bus 48 identifies itself by unique URI as defined in address space URI requirements and user action type that will be implemented.

Delivery of user action instances to action providers are provided via a pending user action pattern in which the user action provider polls a list of pending actions from action service bus 46 and selects a pending action to implement. Asynchronous and synchronous data delivery patterns utilized for delivery of events and actions are typically not made available for user actions because of the involvement required from a user to select a user action to complete.

User Action Consumers

User action consumer 34 is a type of bus endpoint that invokes actions provided by application-specific implementations connected to user action consumers 34 and made available by user action service bus 48. Once again, each user action consumer 34 connected to the user action service bus 48 identifies itself by unique URI as defined in address space URI requirements and user action type that it is going to use. The user actions invoked by a particular user action consumer 34 are determined based on an action subscription associated with each user action consumer 34, wherein action subscriptions may be based on user action type, entity name, entity type, entity type and user action provider name, or by URI.

User action service bus 48 manages a plurality of user action invocation patterns, including user action pattern and user notification pattern. User action 34 utilizes the user action pattern to invoke user actions that will return a result to user action 34, whereas user action 34 utilizes the user notification pattern to invoke user actions that will not return a result to user action 34.

User Action Instances

User actions are identified by type, which may include a combination of simple and/or complex data types supported by the implementation logic of the action (e.g., .Net, Java, etc.). In an exemplary embodiment, each action instance invoked on pattern-based service bus 14 includes the following fields:

Identification—uniquely identifying each user action instance,

Source—URI of the user action consumer that requested the user action instance;

Target—URI of the user action provider that will perform the work on behalf of the user action instance;

User Identification—information identifying a user that performed the invoked user action instance;

Inputs—actual payload carried by the user action instance, defined by the concrete implementation of the derived event type, Outputs—actual payload carried by the user action instance from the user action implementation, defined by the concrete implementation of the derived event type;

Result—string value that is used by the user action consumers when evaluating the result of user action execution, wherein the result is set by the user action provider;

Start time stamp—UTC time stamp of the action originated from a user action consumer End time stamp—UTC time stamp of the action completion by a user action provider; and User Action Context—defined as a typed object, included with each user action instance to aid a user or an algorithm in selecting a user action to perform.

In comparing user action instances with event instances and action instances, main differences include user identification and user action context fields. User identification is particular useful because it provides an indication of the user that performed the user action. For example, if an invoked user action instance directs a user to check/repair a machine, a useful piece of information is which user performed by the check/repair. Each user action instance will similarly include user action context. Implementations logic associated with a user action provider displays user action context included in the invoked user action instance. Information may include a drop-down like menu that provides sorting and filtering capabilities, allowing a user to select one of a plurality of multiple user actions to perform.

Figure 14:
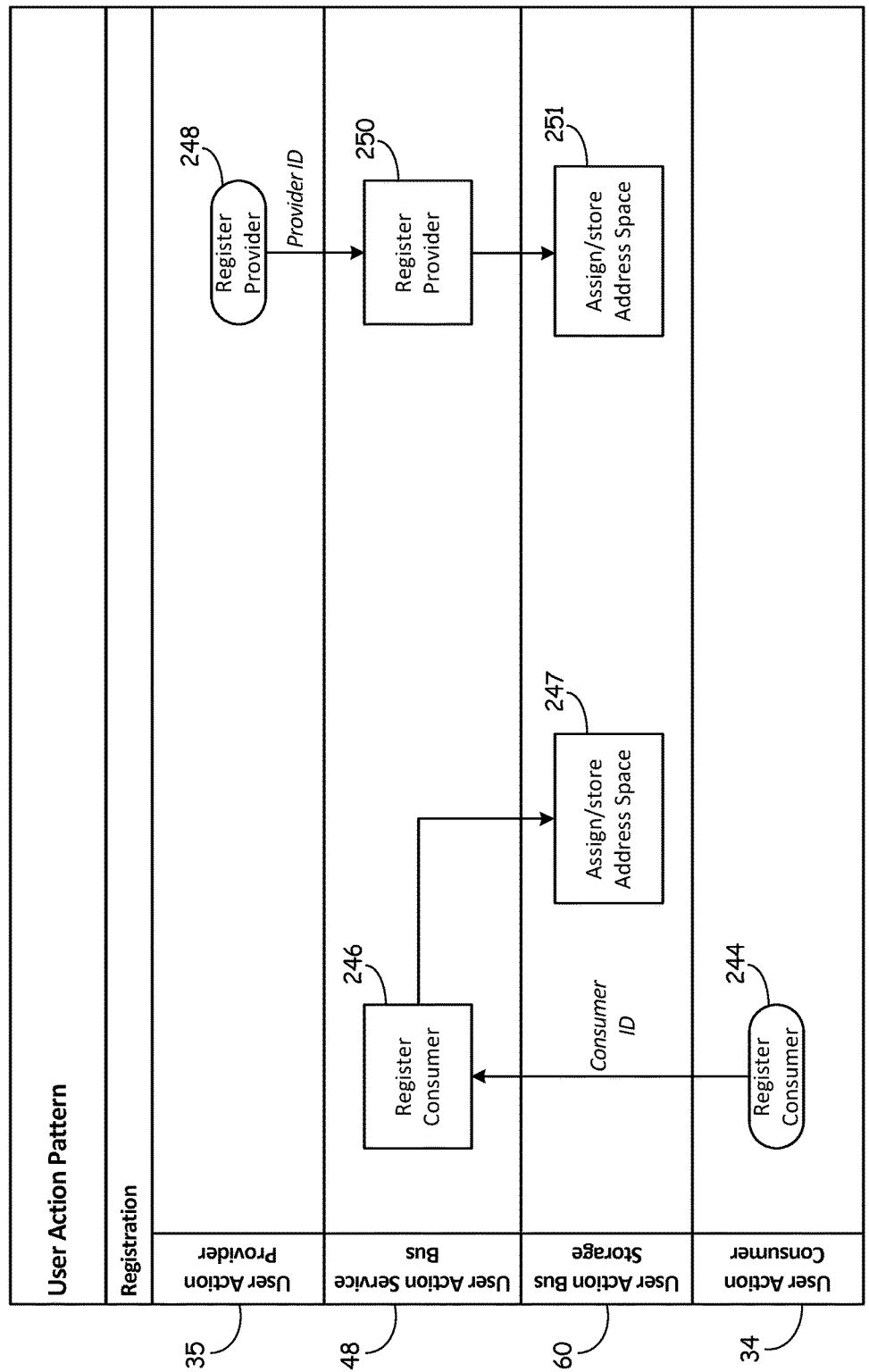
FIGS. 14-16 are block diagrams illustrating various user action bus patterns implemented by the pattern-based service bus according to an embodiment of the present invention.
Figure 15:
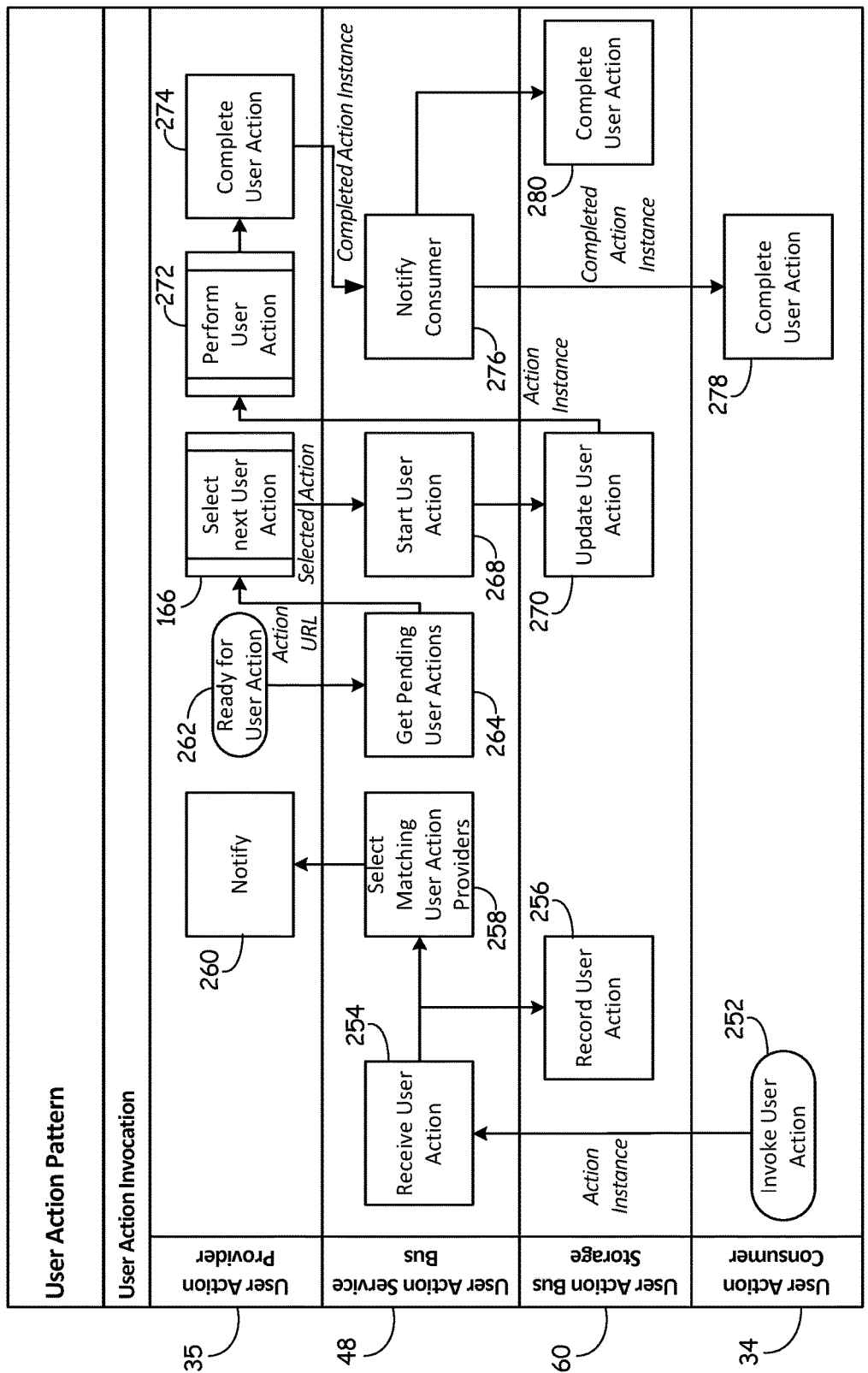
Figure 16:
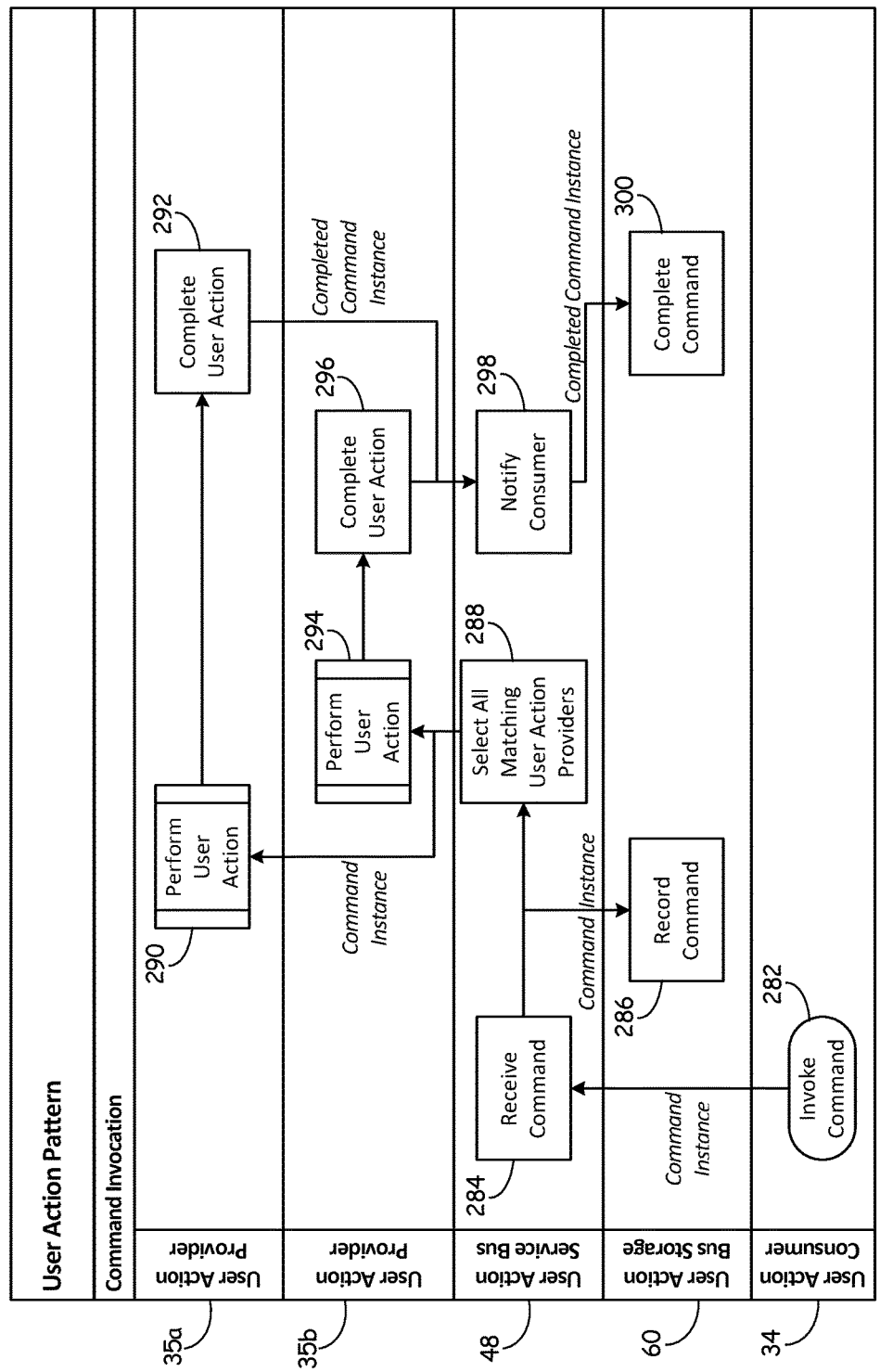

FIGS. 14-16 illustrate interactions between user action consumers 34, user action providers 35, user action service bus 48, and action storage bus 60 to implement a plurality of user action patterns. In particular, the figures illustrate execution of user action bus patterns to perform activities such as registering user action providers and user action consumers, invoking user actions, and user command invocation.

In the embodiment shown in FIG. 14, user action consumer 34 and user action provider 35 are registered with bus-pattern service bus 14. The registration of user action consumers 34 and user action providers 35 is similar to the registration of event consumers 30 and event providers 31, and action consumers 32 and action provider 33. At step 244 user action consumer 34 is connected to pattern-based service bus 14, and interacts with user action bus service 48 and bus address space service bus 54 to register user action consumer 34. In the embodiment shown in FIG. 14, user action consumer 34 provides identifying information to user action bus service 46 that includes subscription information identifying those user actions to be invoked by user action consumer 34. At step 247, user action bus service 48 interacts with address space service bus 54 to store information identifying user action consumer 34, including the URI assigned to user action consumer 34 by address space service bus 54.

In one embodiment, user action subscription may be set to a plurality of different types, such as action type, entity name, entity type, URI, or a combination thereof. For example, subscription by action type indicates that any action provider of the same type can perform the action. Subscription by entity name restricts performance only to those entities matching the entity name, whereas subscription by entity type restricts action performance to those entities of the same type regardless of entity name. Subscription by URI restricts performance of invoked action only to the action provider residing at the subscribed URI.

User action consumers 34 may also designate the user action invocation pattern to be utilized in invoking actions. For example, in one embodiment user action consumers 34 may utilize a user action invocation in which a result is returned to user action consumer 34 or a command invocation in which no result is returned to user action consumer 34.

Similarly, at step 248 user action provider 35 is connected to pattern-based service bus 14, and at step 250 interacts with user action bus service 48 to register user action provider 35. In the embodiment shown in FIG. 14, user action provider 35 provides identifying information to user action bus service 48, including information about data types to be accepted by user action provider 35. In addition, user action provider 35 may provide information regarding the user ID and/or role of a user associated with user action provider 35. In other embodiments, a plurality of users may have access to user action provider 35, and information regarding a particular user utilizing user action provider 35 is provided during delivery of pending user actions. At step 251, user action bus service 48 interacts with address space service bus 54 to store information identifying user action provider 35, including the URI assigned to user action provider 35 by address space service bus 54.

User action provider 35 also indicates to action service bus 48 a designated delivery pattern. However, in one embodiment because all user actions require interaction on behalf o a user, the only delivery pattern made available for delivery of user action instances is a pending user action pattern similar to the pending action delivery pattern described with respect to FIG. 13, above. However, in other embodiments various other delivery patterns may be employed if appropriate.

FIG. 15 illustrates use of user action patterns implemented by user action service bus 48 to handle user action invocations according to an embodiment of the present invention.

In the embodiment shown in FIG. 15, user action consumer 34 invokes an user action at step 252 by interacting with user action service bus 48 to submit an user action instance. At step 254, user action service bus 48 receives the user action instance and at step 256 interacts with user action bus storage 60 to store the user action instance to persistent memory. Based on the subscriptions associated with user action consumer 34, user action service bus at step 258 selects one or more user action providers for performing the invoked action. At step 260, user action service bus 48 interacts with user action providers 35 to notify user action providers 35 of a pending user action. In the embodiment shown in FIG. 15, because a user action requires some participation on behalf of a user, direct invocation of a user action (as described with respect to synchronous and asynchronous delivery of events and actions) is not typically available. Rather, a user is notified via notification provided at step 260 and subsequently selects and addresses the pending user action.

At step 262 (subsequent to notification of pending user actions provided at step 260), user action provider 35 is ready to perform a user action. At step 264 user action provider 35 interacts with user action service bus 48 to request a list of pending user actions from user action service bus 48. User action service bus 48 receives the request from user action provider 35, and at step 264 retrieves a list of pending user actions awaiting performance by user action provider 35. User action service bus 48 maintains a list of pending user actions that are either assigned specifically to user action provider 35 or may be performed by user action provider 35.

In one embodiment, the indication provided by user action provider 40 to user action service bus 48 may include input provided by a user that includes a user ID and/or role information that is employed by user action service bus 48 to select pending user actions. In other embodiments, all users that have access to user action provider 35 may be capable of completing the pending action, and therefore no user ID and/or role information is required at step 264 to select pending user actions other than identifying information associated with user action provider 40.

Having retrieved pending user actions at step 264, user action service bus 48 interacts with user action provider 35 to deliver a list of pending user actions available for performance by user action provider 35. Once again, the actual user action instances are not provided to user action provider 35, only a list of pending user action instances that may be performed by user action provider 35. However, because a user is required to make selections regarding the next user action to perform, user context information associated with user action instances may be provided as part of the pending user action list. Application logic associated with user action provider 35 utilizes the user action context information to display pending user actions to the user, and allow functionality like sorting and filtering of pending user actions to aid the user in selecting a pending user action.

At step 266, user action provider 35 selects a user action to perform and interacts with user action service bus 48 to indicate the user action instance selected for performance. At step 268, user action service bus 46 receives the selection from user action provider 35 and starts the action. In particular, at step 270 user action service bus 48 interacts with user action bus storage 60 to retrieve the user action instance to be performed and update the status of the action instance in user action bus storage 60. Having retrieved the action instance to be performed, user action bus storage 60 interacts with user action provider 35 to deliver the selected user action instance to user action provider 35.

At step 272, user action provider 35 performs the user action. At step 274, user action provider 35 interacts with user action service bus 48 to complete the action, which may include modifying the action instance to include results of the action performed. In particular, with respect to user actions, user action provider may include user identification information and/or role identifying information as part of the user action instance provided to user action service bus 48. This information is useful in identifying the user responsible for completing the action. At step 276, user action service bus 48 interacts with user action bus storage 60 to store the completed user action instance to persistent memory at step 280 and with user action consumer 38 to deliver the completed user action instance to user action consumer 34 at step 278. The user action instance returned to user action consumer 38, as well as the user action instance stored to persistent memory, may include a result field that indicates the status of the user action (e.g., whether the action was completed, etc.) The user action instance may also include information regarding the user that performed the action.

FIG. 16 illustrates use of user action patterns implemented by user action service bus 48 to handle user command invocations provided to a plurality of user action providers according to an embodiment of the present invention. In general, user command invocation is similar to user action invocation, except that the user action consumer that invokes the command does not expect to receive a response from the user action provider. User action commands are commonly employed to broadcast commands to a plurality of matching user action providers.

In the embodiment shown in FIG. 16, user action consumer 34 invokes an user command at step 282 by interacting with user action service bus 48 to submit an user command instance. At step 284, user action service bus 48 receives the user command instance and at step 286 interacts with user action bus storage 60 to store the user command instance to persistent memory. Based on the subscriptions associated with user action consumer 34, user action service bus at step 288 selects one or more user action providers for performing the invoked command. In the embodiment shown in FIG. 16, the invoked user action instance indicates that all matching user action providers should perform the invoked instance. At step 290, user action service bus 48 interacts with user action providers 35a and 35b to deliver the invoked user action command. In some embodiments, this may include providing notice to user action providers 35a and 35b of a pending user action, as described with respect to FIG. 15. In the embodiment shown in FIG. 16, user action service bus 48 delivers the user command instances to each user action provider 35a and 35b for performance to notify user action providers 35 of a pending user action.

At steps 290 and 294, user action providers 35a and 35b, respectively, perform the user command. At steps 292 and 296, respectively, user action providers 35a and 35b interact with user action service bus 48 to complete performance of user action commands and return user action command instances to user action service bus 48. Once again, results may include an indication of the user that performed the user command instance and the result of performance of the command. Typically, user action service bus at 298 would communicate the results of the performed user action to user action consumer 38. However, because user action consumer 34 provided a user command instances rather than user action instances, user action service bus 48 does not return any results to user action consumer 34. Rather, user action service bus 48 interacts with user action bus storage 60 at step 300 to store the complete user command instance to user action bus storage 60.

Configuration Bus Pattern

Pattern-based service bus 14 implements configuration patterns that allow one or more external applications to upload configurations of a particular instance onto pattern-based service bus 14 and allows one or more configuration consumers to read configuration information from pattern-based service bus 14 as well as to receive change notifications regarding configurations. Configuration information may include any information utilized by components interacting with pattern-based service bus 14. For example, configuration information may include an email address of a network administrator that is utilized by a plurality of components or systems connected to pattern-based service bus 14. Rather than change the administrator email address with respect to each component, the administrator email can be stored as a configuration file and each of the plurality of components can subscribe to the configuration file via configuration consumer 38 (shown in FIG. 2). Changes to the configuration file will result in configuration consumers that subscribe to the configuration file being informed of the change in administrator email address. Configuration files may also include other types of configurations information as well, including information regarding those bus-participants connected to pattern-based service bus, including the identification of bus participants, types of interactions provided by each bus participant, and the type of activities invoked/performed by each bus participant.

Configuration Consumer

Configuration consumers 38 are a type of bus endpoint that reads and uses configuration items from configuration service bus 52. In one embodiment, configuration consumers 38 utilize configuration subscription and configuration read patterns to read configuration information associated with pattern-based service bus 14. In particular, configuration consumers utilize read patterns to query pattern-based service bus 14 regarding particular configuration blocks or categories of configuration blocks. Configuration consumers utilize subscription patterns to receive updates on changes to configuration blocks and/or the addition of new configuration blocks Configuration Definition Configuration instances provided by configuration consumer 38 to pattern-based service bus 14 are defined as a typed object that include a base configuration shared by all configuration instances. In an exemplary embodiment, configuration instances include 1.) an identification field that identifies a configuration data block; 2.) a category field that allows grouping of configurations; 3.) a version field that provides a version label of the data managed by the source of the configuration; 4.) a revision field that identifies bus-managed revisions of the configuration; 5.) a value field that provides a value associated with the configuration time; and 6.) a time stamp field that identifies a time that the value field was modified.

Figure 17:
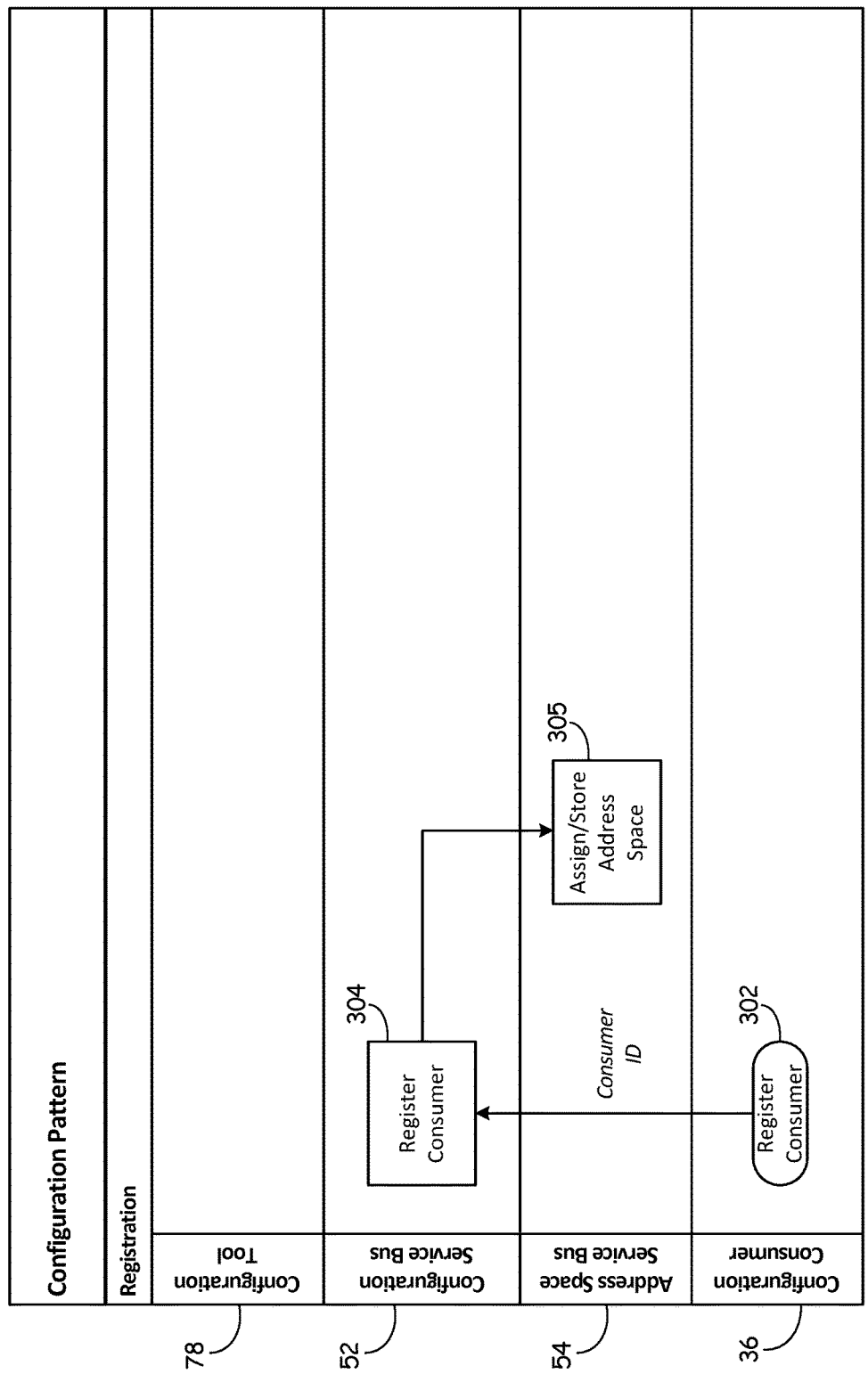
FIGS. 17-19 are block diagrams illustrating various configuration bus patterns implemented by the pattern-based service bus according to an embodiment of the present invention.
Figure 18:
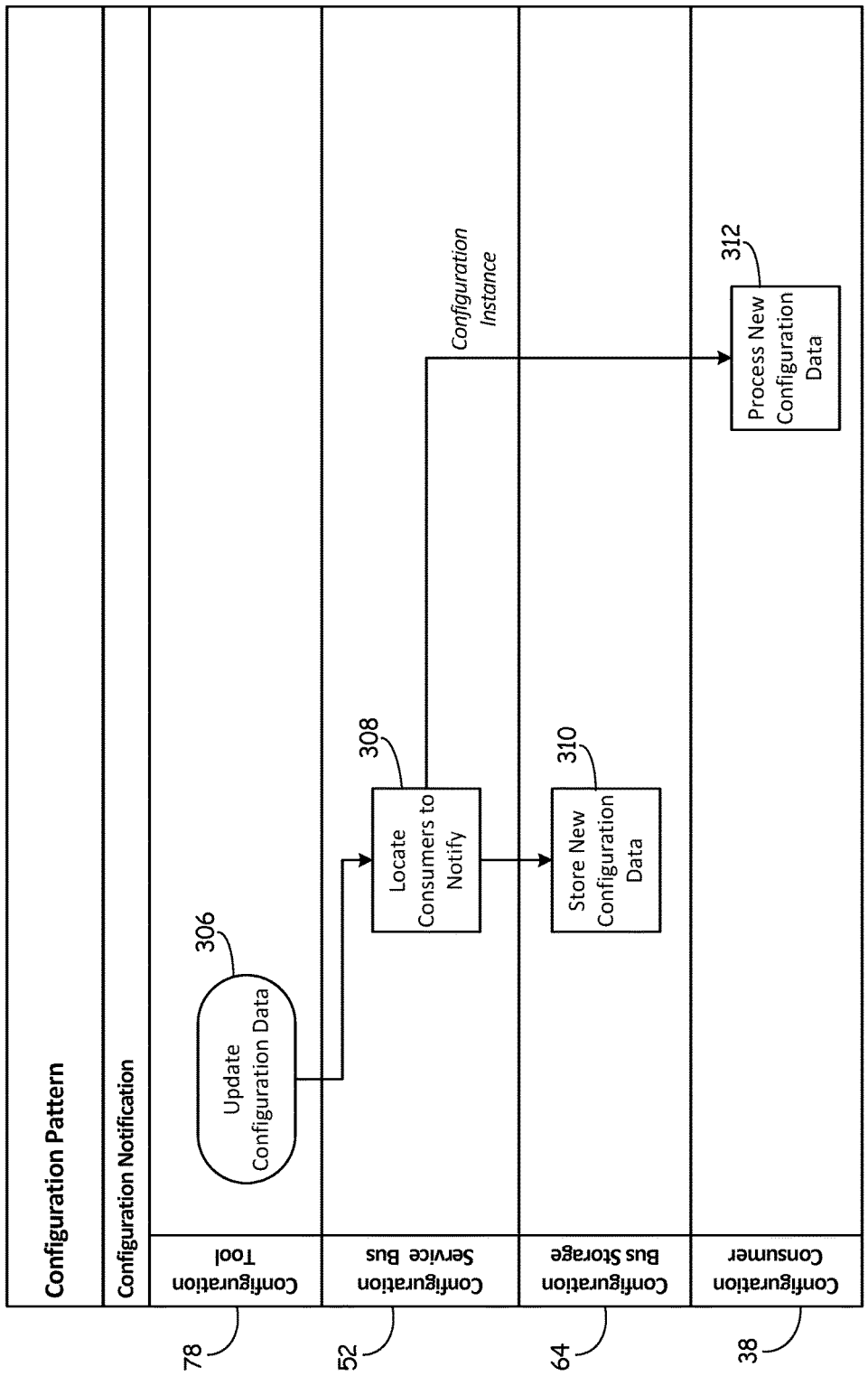
Figure 19:
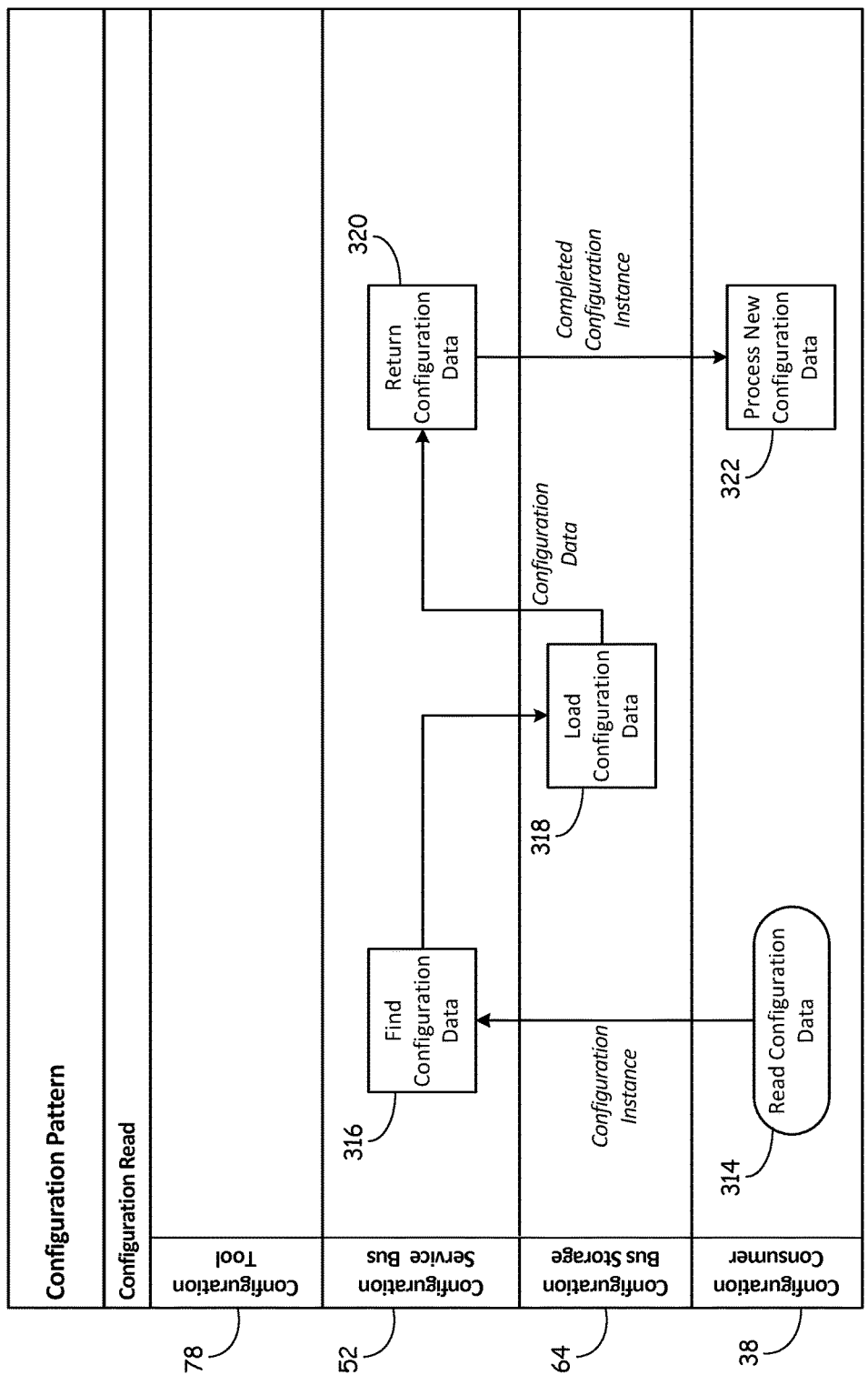

FIGS. 17-19 illustrate interactions between configuration consumers 38, configuration bus service 52, configuration bus storage 64, and configuration tool 78 to implement configuration bus patterns that allow a configuration consumer to receive configuration information from pattern-based service bus 14.

In FIG. 17, configuration consumer 38 is registered with pattern-based service bus 14. The registration of configuration consumers 38 is similar to the registration of other bus participants. At step 302, configuration consumer 38 is connected to pattern-based service bus 14, and interacts with configuration bus service 52 and bus address space service bus 54 to register configuration consumer 38. In the embodiment shown in FIG. 17, configuration consumer provides identifying information to configuration bus service 52 that may include subscription information identifying the configuration data block categories to be monitored by configuration consumer 38. At step 305, configuration service bus 52 interacts with address space service bus 54 to store information identifying configuration consumer 38, including the URI assigned to configuration consumer 32 by address space service bus 54.

In one embodiment, configuration subscriptions may be defined by an identified data configuration block to monitor for changes (e.g., an administrator's email address), or may be defined as all configuration data blocks for a specific category (e.g., all stored email addresses). A change to configuration data made by a user via configuration editing and management tool 78 (shown in FIG. 2) would be automatically provided to configuration consumers 38 subscribing to the particular configuration block or category associated with the configuration block modified.

FIG. 18 illustrates an embodiment in which pattern-based service bus 14 is reports modification of configuration data to configuration consumer 38. At step 306, configuration tool 78 interacts with configuration service bus 52 to update configuration data. In response to the modification of configuration data, configuration service bus 52 at step 308 identifies configuration consumers subscribing, in some way, to the configuration data that was modified. At step 310, configuration service bus 52 stores an instance of the new configuration data to configuration storage bus 64. At step 312, configuration service bus 52 interacts with configuration consumer 38 to deliver a configuration instance reflecting modifications made to the configuration data to configuration consumer 38. In response, configuration consumer 38 processes the new configuration data, but does not provide a response to configuration service bus 52.

FIG. 19 illustrates an embodiment in which a configuration consumer 38 interacts with configuration service bus 52 to read configuration data. At step 314, configuration consumer 38 initiates a read configuration pattern to query configuration service bus 52 regarding configuration data. For example, configuration consumer 38 provides a configuration instance that identifies the configuration data block to be read.

At step 316 configuration service bus 52 locates the configuration data block queried in the configuration instance provided by configuration consumer 38. At step 318 configuration service bus 52 interacts with configuration bus storage 64 to load the configuration data, which is maintained by configuration bus storage 64. At step 320, configuration service bus 52 interacts with configuration consumer 38 to return a configuration instance that includes configuration information queried by configuration consumer 38. For example, the returned configuration instance may include data returned in the version field, revision field, value field, and time stamp field that describe the configuration data block. At step 322, configuration consumer 38 processes the configuration data provided.

Data Bus Pattern

Pattern-based service bus 14 implements data patterns that allow one or more data providers 37 to publish a data item onto pattern-based service bus 14 and allows one or more data consumers 36 to query data items from pattern-based service bus 14 as well as to receive notifications about changes to data items.

Data Consumer

Data consumers 36 are a type of bus endpoint that reads and uses data items from data service bus 50. Data consumers 36 utilize subscription patterns to receive new data of a certain type from data service bus 50, read patterns to read data from data service bus 50, and write patterns to write data to data service bus 50.

Data Provider

Data providers 37 are a type of bus endpoint that connects an application specific implementation of the data item type to data service bus 50, making the data item available on patterned service bus 14. Once connected, data provider 37 may publish data items to data service bus 50.

Data Definition

Data items published to pattern-based service bus 14 are defined as typed objects that include a base configuration shared by all data item instances. In an exemplary embodiment, data item instances include 1.) a name field that identifies the address (e.g., URI) of the data provider; 2.) a value field that is the actual value of the data item; and 3.) a time stamp field that identifies a time that the value field was modified.

Data Service Bus Operations

As described above with respect to other data service buses and the patterns implemented by those buses, data service bus 50 registers data providers 36 and data consumers 37. For example, data provider 36 connects to data service bus 50 and indicates the type of data it is publishing. Data service bus 50 registers the URI of data provider 36 with address space service bus 54. Data provider 36 may then publish data to pattern-based service bus. Published data may be read-only data or writable data. If read-only, then only data provider 36 may edit or modify the data, while data consumers 37 may not. If writable, then data consumers 37 may modify the data published by data provider 36.

Data consumers 37 are similarly registered with address space service bus 54 and may subscribe to data items published by data providers 36 or may query data service bus 50 for specific data items. As discussed above, subscriptions require data consumer 37 to identify data items to which it wished to subscribe. Data service bus 50 automatically delivers data items that are changed or published to subscribing data consumers 37. Data consumers 37 may also submit read requests or queries to data service bus 50. The query identifies the data item or data item type to be read, and data service bus 50 processes the query and returns all data values matching the query to data consumer 37. In addition, data consumers 37 may submit data write requests to data service bus 50. In response, data service bus 50 locates the data provider 36 matching the write request and notifies it about the data write request. The identified data provider 37 handles the write request, either by ignoring the write request or writing the new data and publishing the data to pattern-based service bus 14. In this way, data consumers and providers operate in much the same way that other bus endpoints 20 (described in detail above), in which data consumers/providers utilize the patterns implemented by data service bus 50 to initiate different types of interactions with the services bus.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pattern-based service bus comprising:
a plurality of bus endpoints that interacts with bus participants external to the pattern-based service bus, each of the plurality of bus endpoints identified by a unique address, and type of interaction to be provided by the bus endpoint;
a bus-hosted service that implements patterns that define allowed interactions between each of the plurality of bus endpoints and the bus-hosted service, wherein the implemented patterns can be utilized by the plurality of bus endpoints to interact with the bus-hosted service and wherein the bus endpoints interact with the bus-hosted service without knowledge of one another;
a bus storage component that interacts with the bus-hosted service to store information relevant to operation of the pattern-based service bus; and
an access tool that provides an interface to allow an outside system and/or user to interact with the bus-hosted service and/or the bus storage component.

2. The pattern-based service bus of claim 1, wherein the access tool includes an OData provider that interacts with the bus storage component to provide the outside system access to data published to one or more of the pattern-based service buses.

3. The pattern-based service bus of claim 1, wherein the access tool includes a bus monitoring and management tool that provides a user interface for a user to interact with the bus hosted service.

4. The pattern-based service bus of claim 1, wherein the access tool includes a bus history tool that provides an interface for retrieving stored events from the bus storage component.

5. The pattern-based service bus of claim 1, wherein the access tool includes interfaces that allow the user to interact with the bus-hosted service.

6. The pattern-based service bus of claim 1, wherein access tool includes configuration editing and management tools that allows the user to edit configuration data associated with the pattern-based service bus.

7. A pattern-based service bus comprising:
a plurality of bus endpoints that interacts with bus participants external to the pattern-based service bus, each of the plurality of bus endpoints identified by a unique address, and type of interaction to be provided by the bus endpoint;
a bus-hosted service that implements patterns that define allowed interactions between each of the plurality of bus endpoints and the bus-hosted service, wherein the implemented patterns can be utilized by the plurality of bus endpoints to interact with the bus-hosted service and wherein the bus endpoints interact with the bus-hosted service without knowledge of one another;
a bus storage component that interacts with the bus-hosted service to store information relevant to operation of the pattern-based service bus; and
wherein one of the patterns implemented by the bus-hosted service includes one or more address space management patterns that provide the bus participants with access to the logical organization of the plurality of bus endpoints.

8. The pattern-based service bus of claim 7, wherein the address space management patterns includes an address space management pattern that registers bus participants with the pattern-based service bus.

9. The pattern-based service bus of claim 7, wherein the address space management patterns includes an address space management pattern that removes bus participants from the pattern-based service bus.

10. The pattern-based service bus of claim 7, wherein the address space management patterns includes an address space management pattern that notifies bus participants of changes to the logical organization of the plurality of bus endpoints.

11. The pattern-based service bus of claim 7, an access tool that provides an interface to allow an outside system and/or user to interact with the bus-hosted service and/or the bus storage component.

12. A distributed communication system comprising:
a plurality of bus participants;
a network;
a plurality of pattern-based service buses connected to the network and to at least one of the bus participants, each pattern-based service bus including:
- a bus endpoint that interacts with one of the plurality of bus participants, wherein the bus endpoint is identified by a unique address, and type of interaction to be provided by the bus endpoint;
- a bus-hosted service that implements patterns that define allowed interactions between the bus endpoint and the bus-hosted service, wherein the implemented patterns are utilized by the bus endpoints to interact with the bus-hosted service and wherein the bus endpoints do not have knowledge of other bus endpoints; and
- a bus storage component that interacts with the bus-hosted service to store information relevant to operation of the pattern-based service bus;
wherein one of the patterns implemented by the bus-hosted service includes one or more address space management patterns that provide the plurality of bus participants with access to the logical organization of the bus endpoints implemented by the plurality of pattern-based service buses.

13. The distributed communication system of claim 12, wherein the address space management patterns includes an address space management patterns that allow bus participants to be registered with the pattern-based service bus and removed from the pattern-based service bus.

14. The distributed communication system of claim 12, wherein the address space management patterns includes an address space management pattern that notifies bus participants of changes to the logical organization of the plurality of bus endpoints.

15. The distributed communication system of claim 12, wherein the address space management patterns are utilized to allow interaction with data providers.

16. The distributed communication system of claim 12, wherein the plurality of pattern-based service buses further include an access tool that provides an interface to allow an outside system and/or user to interact with the bus-hosted service and/or the bus storage component.

17. The distributed communication system of claim 16, wherein the access tool includes an OData provider that interacts with the bus storage component to provide the outside system access to data published to one or more of the pattern-based service buses.

18. The distributed communication system of claim 16, wherein the access tool includes a bus monitoring and management tool that provides a user interface for a user to interact with the bus hosted service.

19. The distributed communication system of claim 16, wherein the access tool includes a bus history tool that provides an interface for retrieving stored events from the bus storage component.

20. The distributed communication system of claim 16, wherein the access tool includes interfaces that allow the user to interact with the bus-hosted service.

\* \* \* \* \*